United States Patent [19]
Barkans

[11] Patent Number: 5,598,184
[45] Date of Patent: Jan. 28, 1997

[54] METHOD AND APPARATUS FOR IMPROVED COLOR RECOVERY IN A COMPUTER GRAPHICS SYSTEM

[75] Inventor: Anthony C. Barkans, Ft. Collins, Colo.

[73] Assignee: Hewlett-Packard Company, Palo Alto, Calif.

[21] Appl. No.: 859,213

[22] Filed: Mar. 27, 1992

[51] Int. Cl.$^6$ .................................................. G09G 5/10
[52] U.S. Cl. ........................... 345/149; 345/150; 345/136
[58] Field of Search .................................. 345/136, 137, 345/138, 147, 149, 150, 152, 153, 186; 358/455, 456, 457, 458, 459, 461; 348/625; 395/131, 132, 128

[56] References Cited

U.S. PATENT DOCUMENTS

| | | | |
|---|---|---|---|
| 4,467,322 | 8/1982 | Bell | 340/701 |
| 4,730,185 | 7/1984 | Springer | 340/701 |
| 4,843,380 | 6/1989 | Oakley et al. | 345/137 |
| 4,908,780 | 3/1990 | Priem et al. | 345/136 |
| 4,931,785 | 6/1990 | Ishii | 345/153 |
| 4,956,638 | 9/1990 | Larky et al. | 340/701 |
| 4,991,122 | 2/1991 | Sanders | 364/521 |
| 4,992,781 | 2/1991 | Iwasaki et al. | 345/138 |
| 5,126,726 | 6/1992 | Howard et al. | 345/150 |
| 5,164,717 | 11/1992 | Wells et al. | 345/149 |
| 5,218,649 | 6/1993 | Kundu et al. | 348/625 |

FOREIGN PATENT DOCUMENTS

| | | |
|---|---|---|
| 0219989 | 4/1987 | European Pat. Off. . |
| 0359080 | 3/1990 | European Pat. Off. . |
| 850241604 | 5/1987 | Japan . |
| 2236463 | 3/1991 | United Kingdom . |

OTHER PUBLICATIONS

"The Effect of Dither on Luminance Quantization of Pictures", Lippel, Bernard et al., *IEEE Transactions on Communications Tech.*, vol. Com-19, No. 6, Dec. (1971).

"Saddle Point Systems ADSP-2105 Board Does JPEG Image Compression", *Analog Devices Newsletter—DSPATCH* No. 21, Fall, (1991).

"High Speed High Quality Antialiased Vector Generation" Barkans, Anthony C., Computer Graphics, vol. 24, No. 4, Aug. (1990).

"Dithering for 12–Bit True–Color Graphics", Wells, Stuart C., Williamson, Grant J., et al., *IEEE Computer Graphics & Applications*, pp. 18–30, Sep., (1991).

"Video Compression—New Standards, new chips", Ang, Peng H., Ruetz, Peter A., et al., *IEEE Spectrum*, pp. 16–19, Oct, (1991).

"Fundamentals of Interactive Computer Graphics", Foley, J. D., Van Dam, A., ISBN: 0–201–14468–9, Chapter 17, pp. 593–602.

Analog Devices Data Sheet entitled "Continuous Edge Graphics (CEG), —ADV7148/ADV7141/ADV7146", *Chip Spec Rev. 1.0d*, Jun. 12, 1990.

"Edge Detection and Smoothing of Dithered Images", Takahashi K., Ohta, M., *Trans. Inst. Electron. Commun.Eng. Jpn. D (Japan), Transactions of the Institute of Electronics and Communication Engineers of Japan, Part D*, June 1985, Japan, vol. J68D, pp. 1354–1355 (1985).

European Search Report, Application No. EP 92 11 8978 dated 10 Jun. 1993 (2 pp.).

*Primary Examiner*—Ulysses Weldon
*Assistant Examiner*—Xiao M. Wu

[57] ABSTRACT

Color information lost in a computer graphics system as a result of encoding by dithering is recovered by passing the encoded data through a filter that has the same effective shape and size as the dither matrix used to encode the data. In a system that employs a dither matrix having $2^N$ cells, up to N bits of color information, per color component, is recoverable.

18 Claims, 29 Drawing Sheets

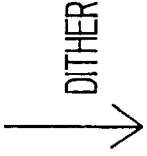
FIG 2C
(PRIOR ART)
DITHER
$i = x \bmod (N), N = 2$
$j = y \bmod (N), N = 2$
FIG 2B
(PRIOR ART)

FIG 2D
(PRIOR ART)

FROM FIG 2C

|   |   |   |   |   |   |   |   |
|---|---|---|---|---|---|---|---|
| 7 | 7 | 7 | 7 | 7 | 7 | 7 | 7 |
| 6 | 7 | 6 | 7 | 6 | 7 | 6 | 7 |
| 7 | 7 | 7 | 7 | 7 | 7 | 7 | 7 |
| 6 | 7 | 6 | 7 | 6 | 7 | 6 | 7 |
| 5 | 4 | 5 | 4 | 5 | 4 | 5 | 4 |
| 4 | 5 | 4 | 5 | 4 | 5 | 4 | 5 |
| 5 | 4 | 5 | 4 | 5 | 4 | 5 | 4 |
| 4 | 5 | 4 | 5 | 4 | 5 | 4 | 5 |

E ← (bold line between rows 4 and 5)

10

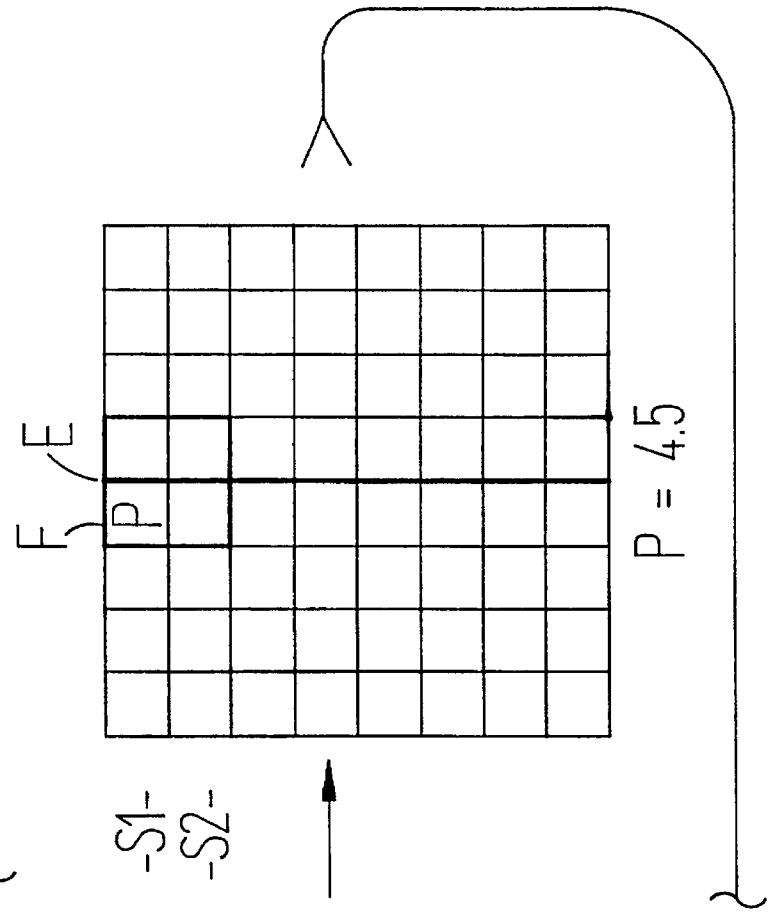
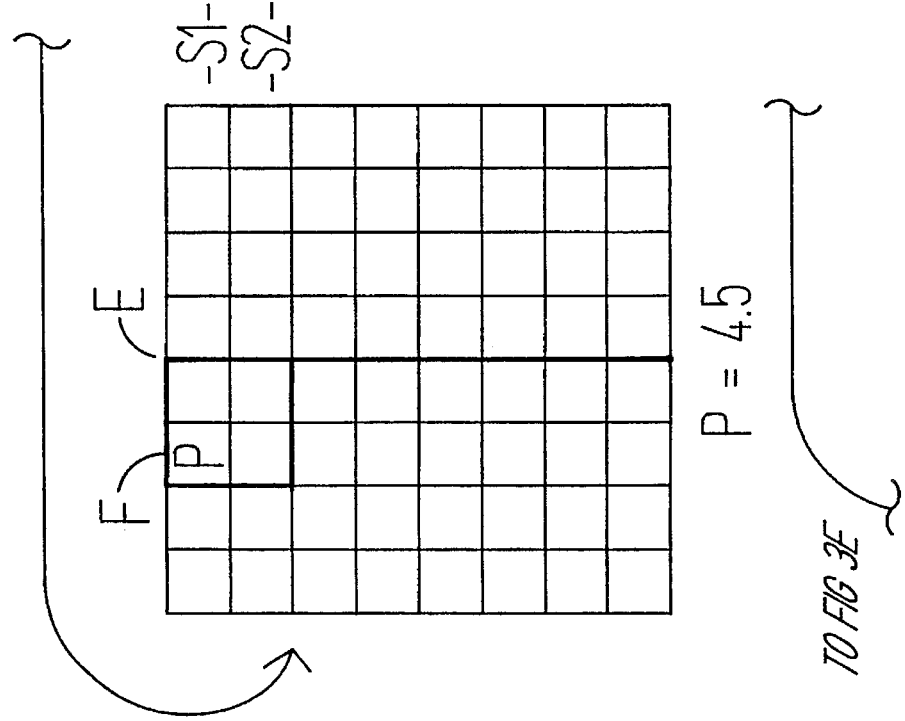
FIG 3D
FIG 3C

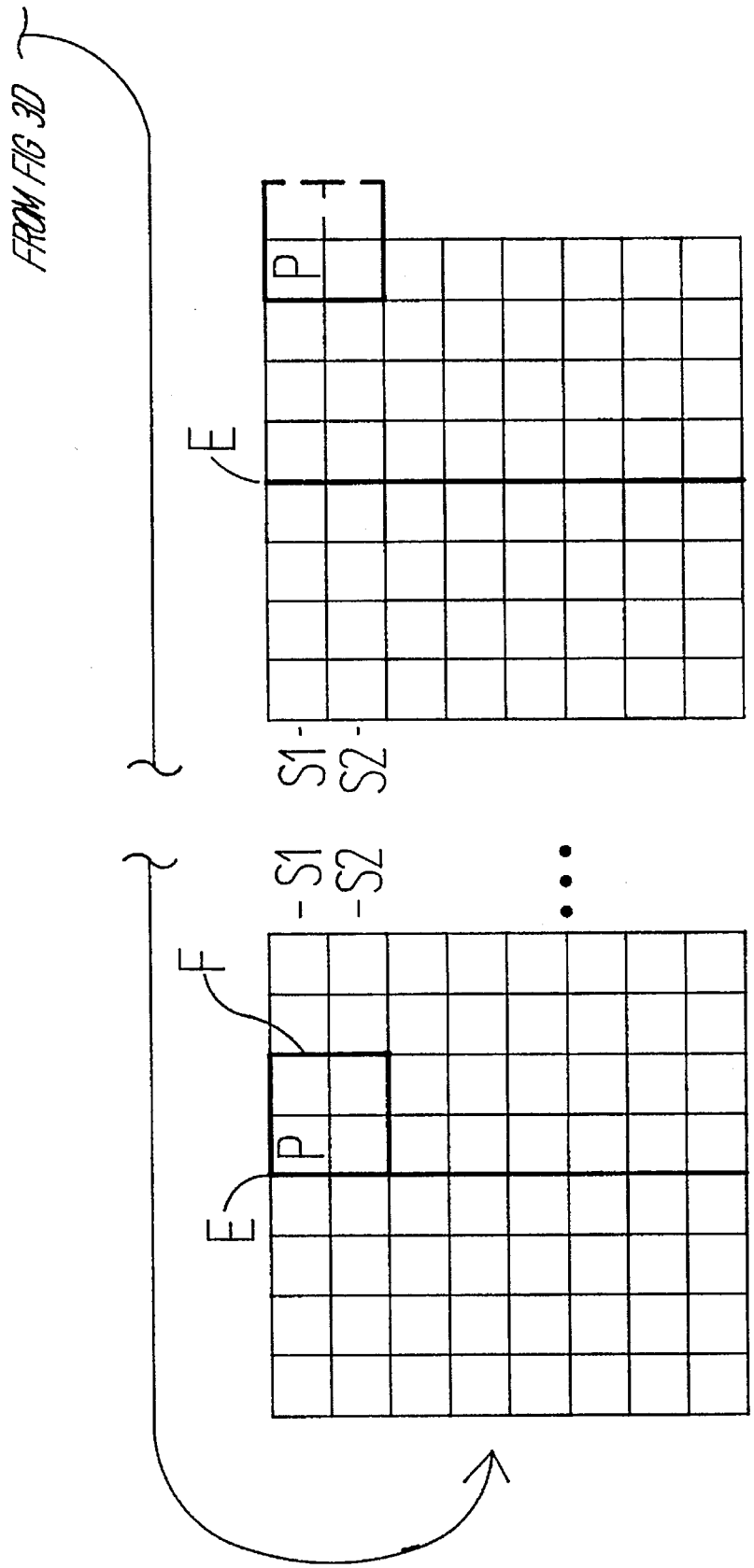
FIG 3F  P = 7
FIG 3E  P = 6.75

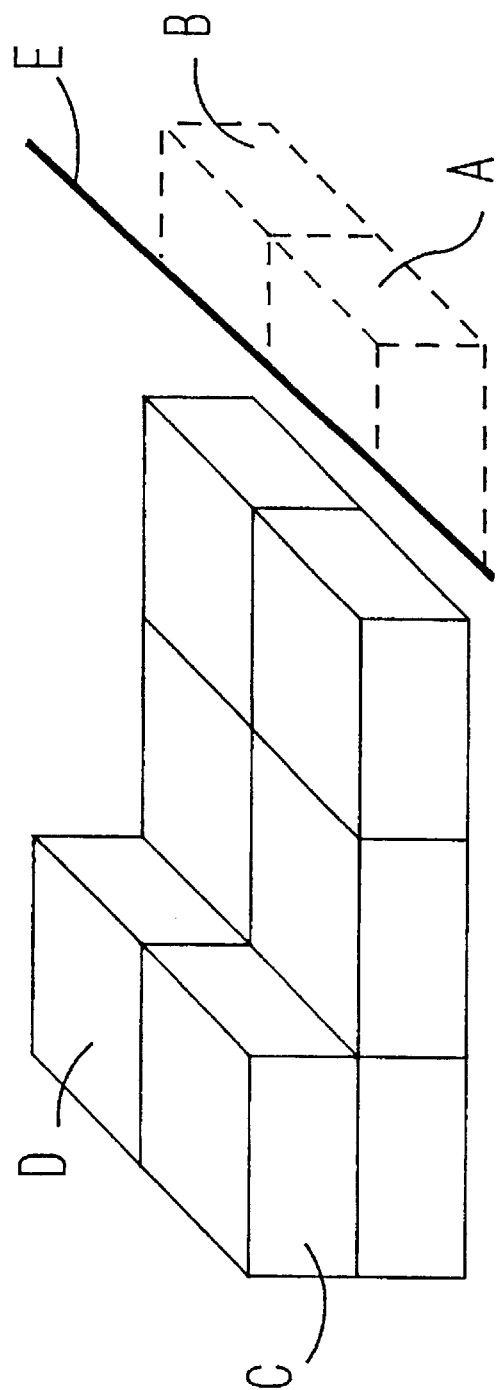

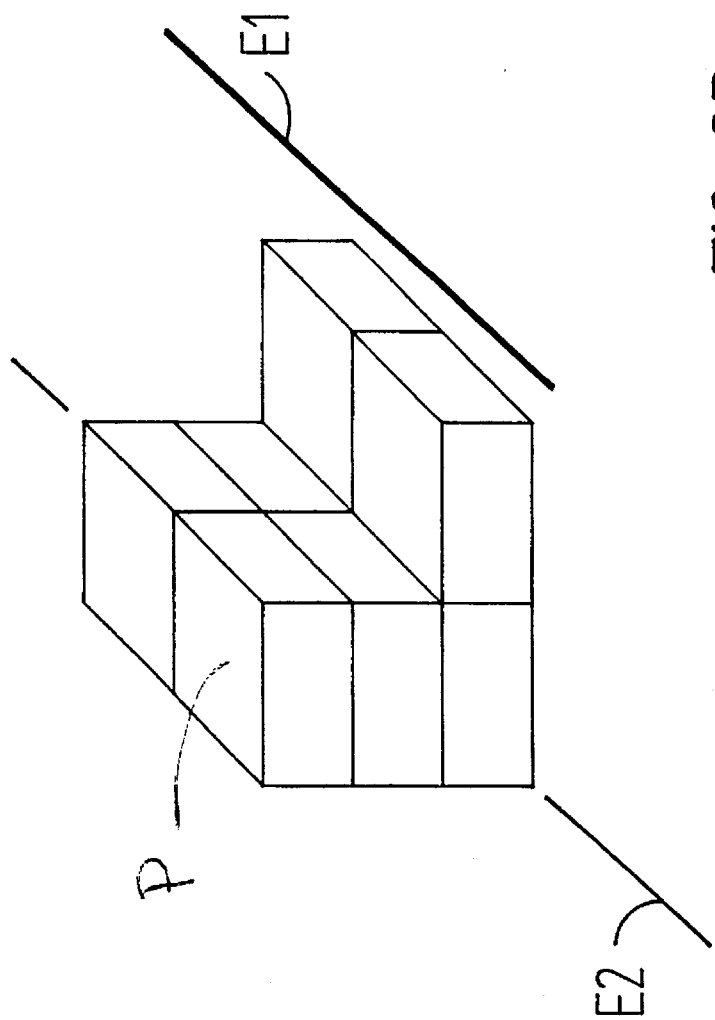

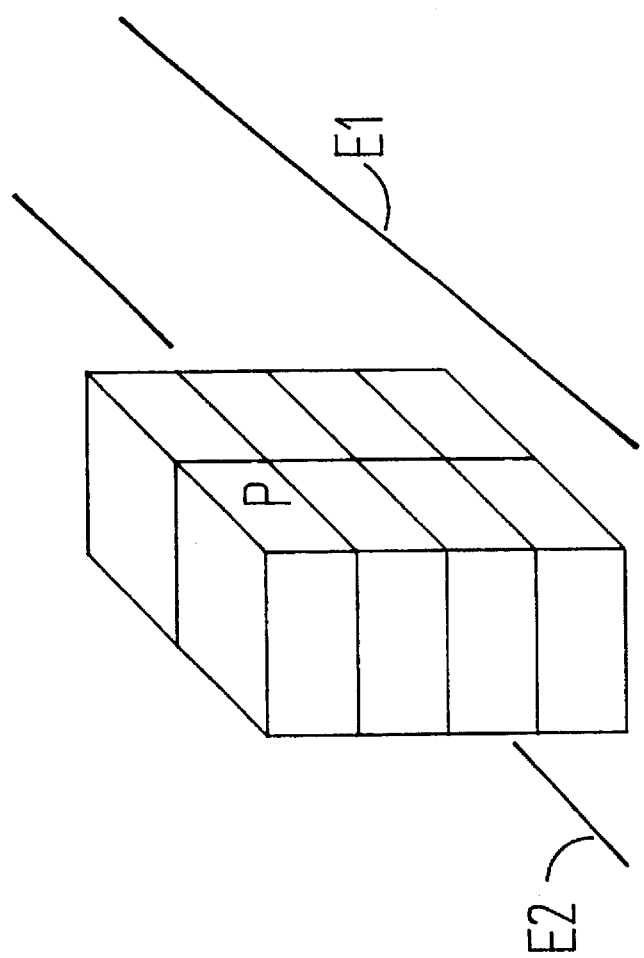

| 5 | 21 | 18 | 29 | 6 | 22 | 17 | 30 | 4 | 20 | 19 | 28 | 7 | 23 | 16 | 31 |
|---|---|---|---|---|---|---|---|---|---|---|---|---|---|---|---|
| 26 | 10 | 13 | 2 | 25 | 9 | 14 | 1 | 27 | 11 | 12 | 3 | 24 | 8 | 15 | 0 |

FIG 10

| M1 | M1 | x | x | x | x | M1 | M1 | M2 | M2 | M2 | M2 | M2 | M2 | M2 | M2 |
|---|---|---|---|---|---|---|---|---|---|---|---|---|---|---|---|
| M1 | M1 | x | x | X | x | M1 | M1 | M2 | M2 | M2 | M2 | M2 | M2 | M2 | M2 |

FIG 11

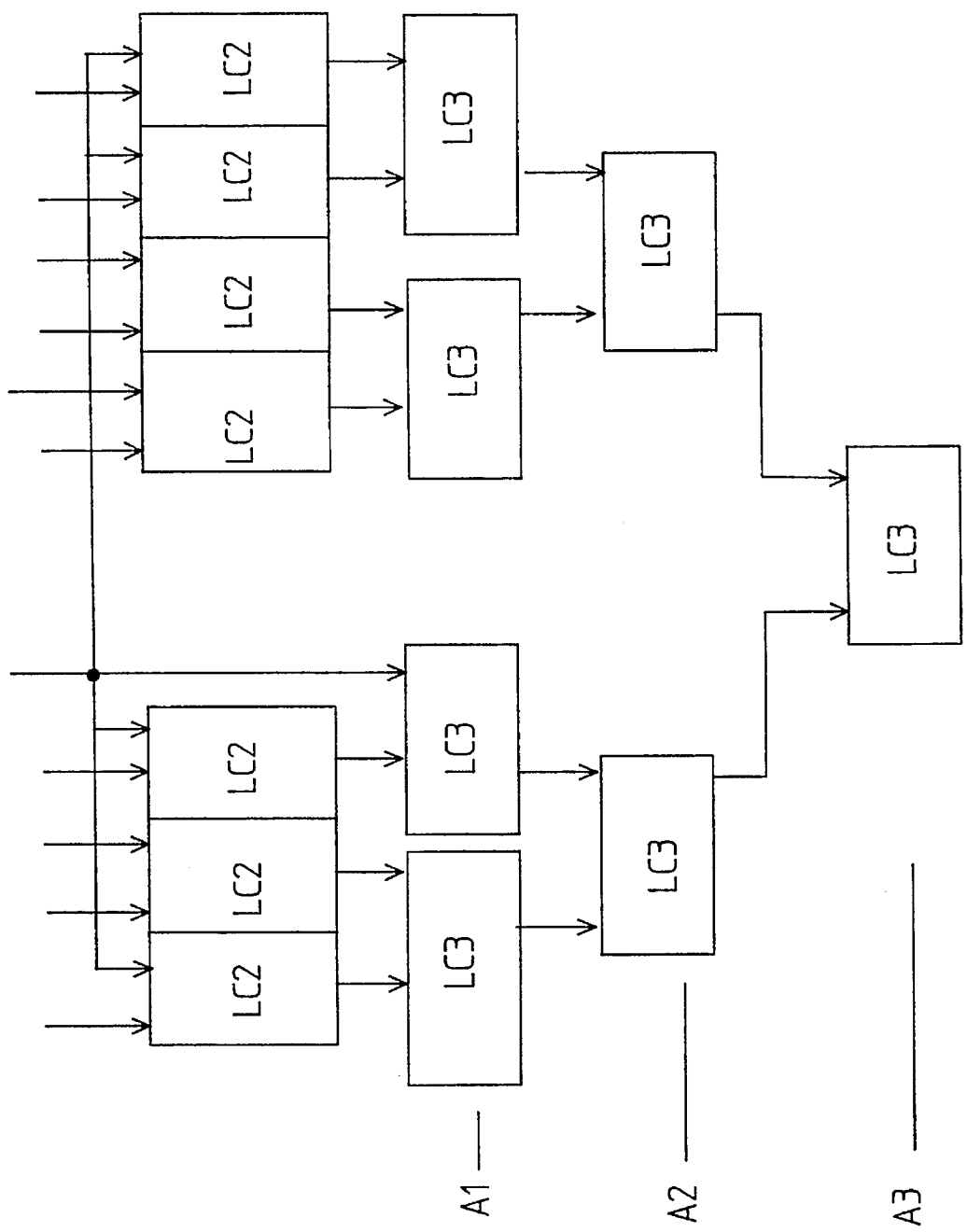

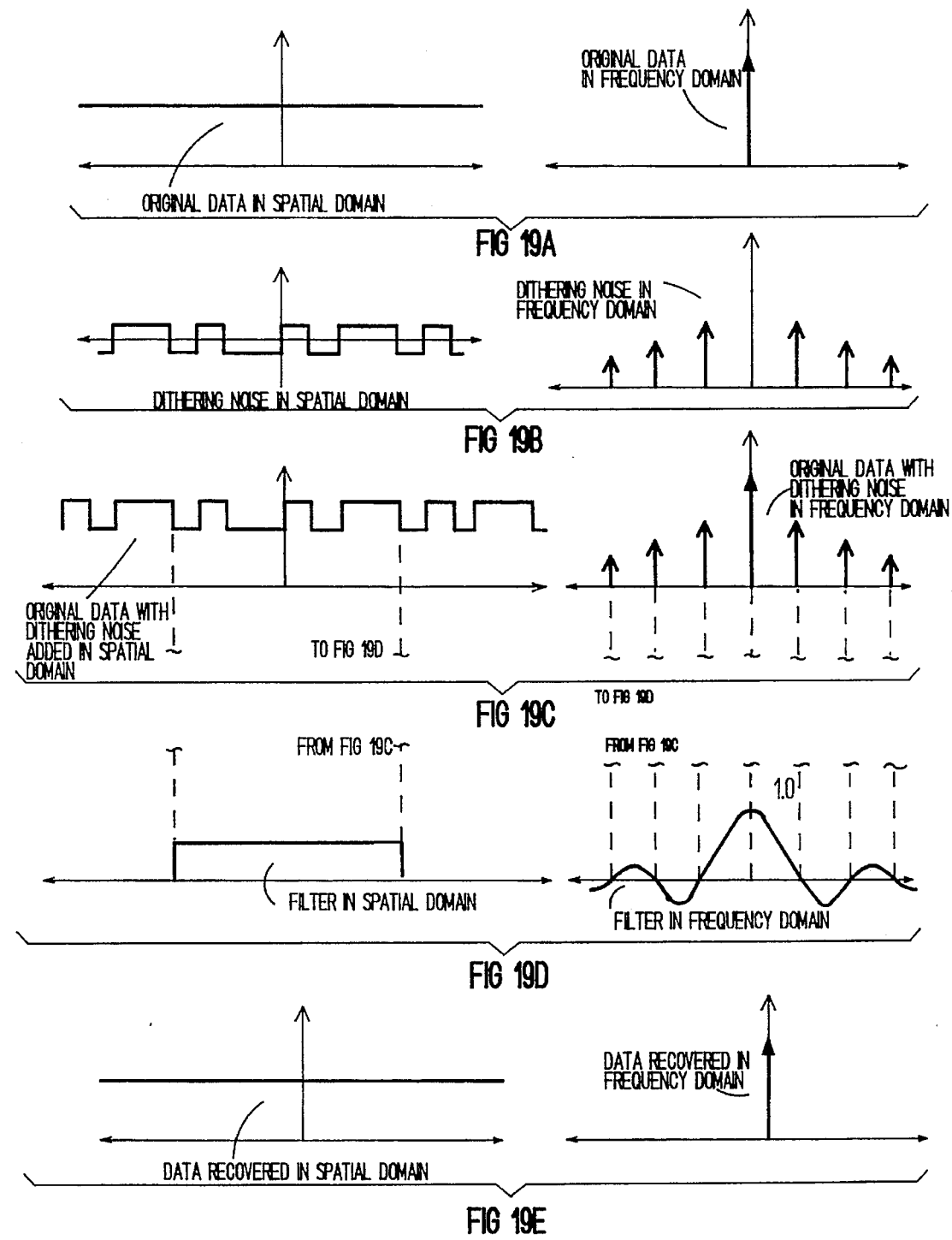

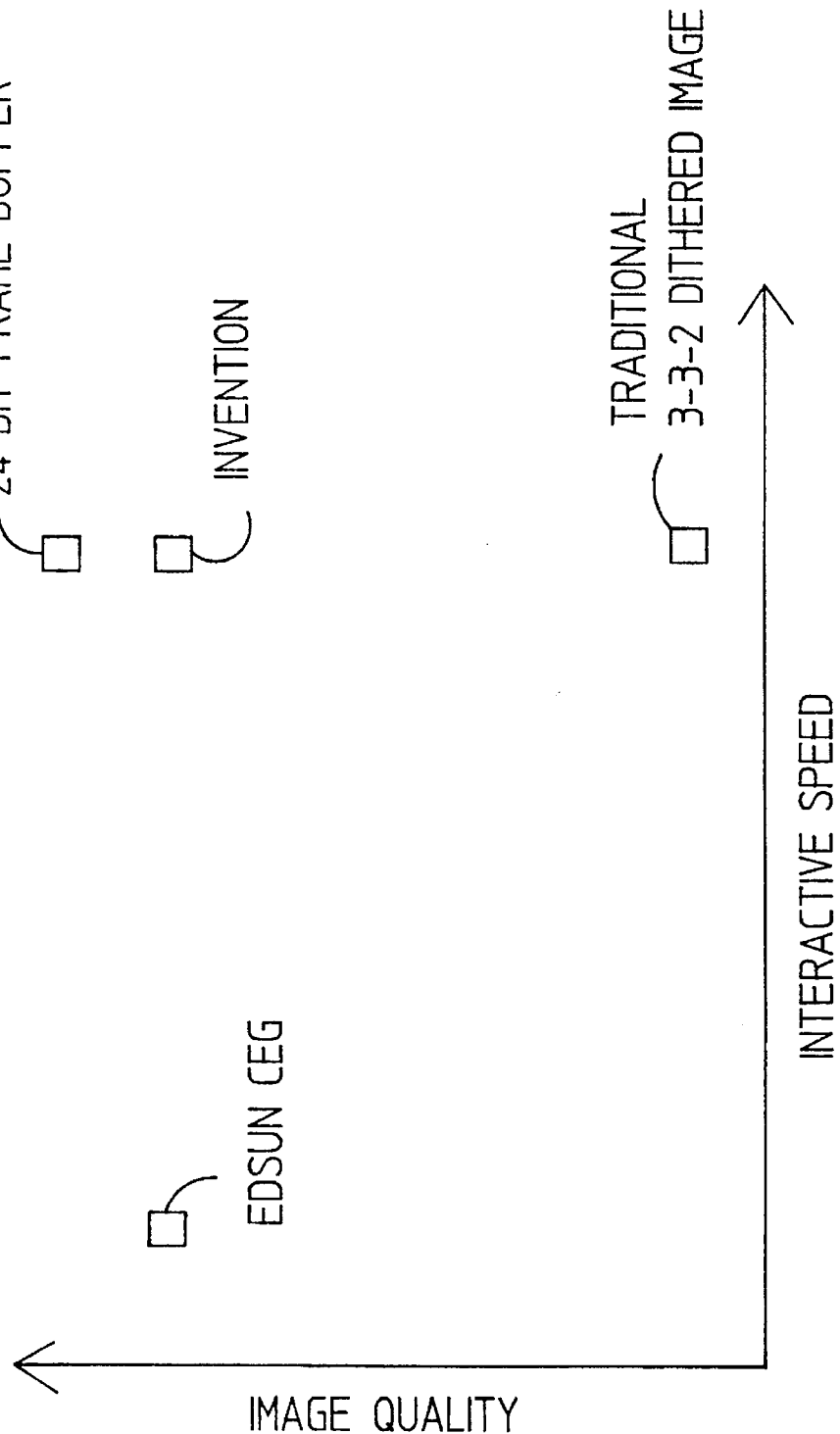

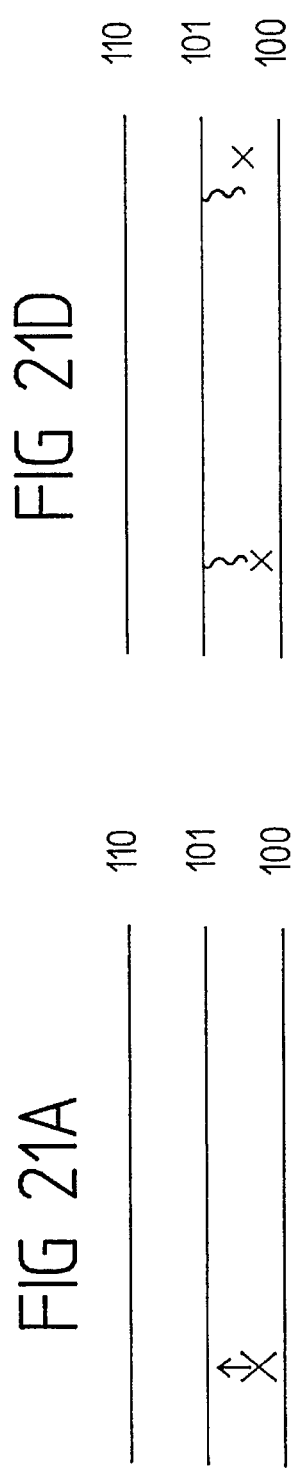
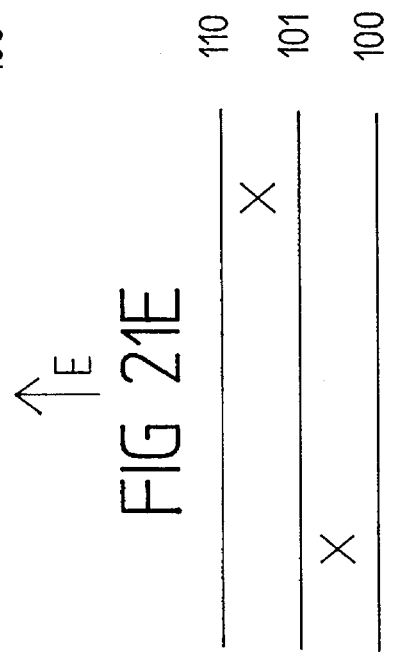

METHOD AND APPARATUS FOR IMPROVED COLOR RECOVERY IN A COMPUTER GRAPHICS SYSTEM

FIELD OF THE INVENTION

The present invention relates generally to color computer graphics. More particularly, the present invention relates to a method and apparatus for recovering color information data that may be lost in a computer graphics system between the time that the system originally generates color information data and the time that it writes corresponding pixel values into a frame buffer.

BACKGROUND OF THE INVENTION

The field of computer graphics concerns the creation, storage, manipulation and display of pictures and models of objects by a digital processor. Color encoders are widely used in computer graphics and color television display systems for encoding the color signals to be displayed on the display screen. FIG. 1 illustrates a simplified prior art computer graphics display system in which the respective green, red and blue digitized color information data generated by a computer system (not shown) are input to respective encoders 10R, 10G and 10B, where they are separately encoded, for storage in a frame buffer 12. The values stored in the frame buffer 12, referred to herein as "pixel values", correspond to ones of the original color information data originally generated by the computer system and input to the encoders 10R, 10G and 10B. The pixel values stored in the frame buffer are used as indices into color lookup tables or color maps 14R, 14G and 14B for determining the actual color to illuminate each pixel in a display device 18. Sometimes, gamma (γ) correction is built into the color maps 14R, 14G, 14B to correct for non-linearities in the display device. The resulting data read from the color maps 14R, 14G and 14B is converted to analog voltages by respective digital to analog converters (DACs) 16R, 16G, 16B, and these analog voltages are applied to the display device 18 in accordance with well-known techniques. Optionally, the DACs could be replaced with drivers for a liquid crystal display (LCD).

Note that the reference to 8 bits in FIG. 1 is exemplary only; while 8 bit color data is typical, such is not required.

One of the problems with prior art computer graphics systems of the type illustrated in FIG. 1 is that the encoders 10R, 10G and 10B are designed to reduce the bit length of the color information data generated by the computer system (e.g., the 8 bit RGB color components shown in FIG. 1) prior to storage in the frame buffer 12. This is done to minimize the size of the required frame buffer 12, thereby minimizing memory requirements and reducing the cost of the system. In many prior art systems, the encoding is performed by dithering the color information data for each color component (the RGB color components in the case of FIG. 1) then, in some dithering methods, truncating. Dithering results in lost color data at each pixel. Though the background and detailed description portions of this application may sometimes describe dithering as including an optional truncating step, the invention is not so limited, and the invetion encompasses any dithering method, irrespective of whether or not truncating is employed.

Dithering is well known in the art. See, for example, *Fundamentals of Interactive Computer Graphics*, J. D. Foley and A. Van Dam, ISBN: 0-201-14468-9. See also, for example, U.S. Pat. No. 4,956,638. Both of these are incorporated herein by reference. In general, dithering is a technique wherein noise is injected into a signal, and then the signal is quantized. More specifically, in computer graphics, dithering means adding a noise signal to the full precision color components at each pixel. The new signal is then quantized to some predetermined number of levels. For example, if the full precision of a color component is represented as an 8 bit number (i.e., the color can take on a value from 0 to 255), then, at each pixel, a small amount of noise (typically less than or equal to 5 bits) is combined with the color component. This new value is then quantized to some smaller number of bits, typically 3. One commonly used quantization method is truncation. The result of this process is illustrated in FIGS. 19A–C (described hereinafter) and in detail in respect to FIG. 2 (described hereinafter). However, it should be noted that there are many different noise function and quantization methods that may be used. One such method is disclosed in the aforementioned U.S. Pat. No. 4,956,638. It should also be noted that one important property of dithering is that, since the color is sampled at each pixel, the values stored at each pixel in the frame buffer will provide a reasonable approximation of the full precision color that it represents. A disadvantage of dither is that the viewing of dithered images is visually annoying because of the artifacts introduced by the dithering process.

Thus, the function of dithering is to permit use of a reduced number of available intensity levels to simulate a larger range of intensity levels. The prior art example of FIG. 1 illustrates a typical case where the computer system generates an 8-bit color information word for each color component, and the encoders 10R, 10G dither and optionally truncate to provide 3-bit pixel values for the R and G color components, and the encoder 10B dithers and truncates to provide a 2-bit pixel value for the B color component. This type of encoding, known as 3-3-2 encoding, is well known in the art. By way of another example, the computer system may generate the same 8-bit RGB color components, and the encoders 10R, 10G and 10B might each provide corresponding 4-bit pixel values. This type of encoding, known as 4-4-4 encoding, is also well known in the art.

Either way, the encoding results in a reduced number of colors available for display. In the example of FIG. 1, where each color component has 8-bits prior to encoding, there are $(2^8)^3$, or 16,777,216 colors available for display prior to encoding. After encoding, each of the R and G color components has only 3 bits, and the B component has only 2 bits and only $(2^3)^2 \times 2^2$, or 256 colors, are available for display. In a 4-4-4 encoding system, where each color component is the same 8 bits long before encoding, only $(2^4)^3$, or 4096, colors are available after encoding. This reduction in available intensities by the use of dither gives rise to visible artifacts in the display.

It should also be noted that the components need not necessarily be RGB, but may be YUV instead, where Y is the luminance component, U is blue-yellow difference component, and V is the red-yellow difference component. Though the prior art and the invention are described herein as using RGB components, it should be understood that this is for purposes of explanation only, and that the invention is not limited thereto. The invention encompasses use of the YUV components, or even other components, as well.

FIG. 2 illustrates application of the dithering technique explained in connection with FIG. 1, and how this encoding technique may give rise to artifacts. In particular, FIGS. 2A–2D illustrate application of the dithering technique to one of the color components, it being understood from above that this technique is applied by each of the encoders 10R, 10G, and 10B to each of the color components.

FIG. 2A illustrates a hypothetical frame for one color component of a hypothetical image having relatively flat color fields (i.e., no color changes) on the left and right sides of an edge E. An edge is defined as a color transition, e.g., a change in magnitude of one or more of the RGB components. Each block in FIG. 2A contains a color information value, in decimal, for a corresponding pixel. As shown, the decimal value corresponding to each pixel on the left side of the edge E is 4.5 and the decimal value corresponding to each pixel on the right side of the edge E is 6.75. In binary terms (where only two binary digits are needed to the right of a "binary point" to represent the quarter decimal values of ¼, ½ and ¾), these values translate to 100.10 and 110.11, respectively, as shown in FIG. 2A.

A hypothetical dither matrix for this color component is illustrated in FIG. 2B. The dither matrix of FIG. 2B has four dither cells, each with the quarter decimal values shown therein. Those skilled in the art will readily appreciate that application of the dither matrix of FIG. 2B to the decimal color component values of the image of FIG. 2A will, after quantization, result in 3-3-2 format data (where the binary digits to the right of the binary point are the values that are truncated), result in the binary values illustrated in FIG. 2C. FIG. 2D is the same as FIG. 2C except that the values are represented in decimal. In the prior art, it is the values of FIG. 2C that are stored in the frame buffer 12 as the pixel values. (However, note that if FIG. 2C were for the B component, there would be only 2 bits of data for each pixel when 3-3-2 encoding is used. Thus there would be only 2 bits of the B component stored in the frame buffer 12 for each pixel).

Thus, it will be appreciated, that FIG. 2A represents one color component of a hypothetical image as input to one of the decoders, e.g., 10R, 10G. FIG. 2D represents the output of that decoder. A comparison of FIG. 2D to FIG. 2A illustrates how and why artifacts occur in the image to be displayed. Whereas the color fields are perfectly flat to the left and right of the edge E in FIG. 2A, the same is not true after dithering and quantization, as shown in FIG. 2D. More importantly, it will be seen that the pixel values in FIG. 2D vary widely from their original corresponding values in FIGS. 2A. One result of this is that dither artifacts will be seen in the otherwise flat color region. Another result is that, whereas the edge E represented by the values of FIG. 2A would be "clean" if those values were used to display the image, the pixel values of FIG. 2D will cause the displayed edge E to appear jagged, or otherwise have artifacts.

In the prior art, some efforts have been made to increase the number of colors that can be displayed using the reduced number of storage elements in the frame buffer. These approaches rely primarily on color compression and decompression. For example, the Analog Devices family of ADV7148/ADV7141/ADV7146 integrated circuits, which embody a method known as Edsun Continuous Edge Graphics (CEG), employ a coloring encoding algorithm wherein color information and alpha values for each pixel are stored in an 8 bit deep frame buffer. These are mixed after the color map, then sent to the DAC. The result is that a single image may contain a different color at each pixel (i.e., over 1,000,000 different colors may be displayed in a single image). However, the Edsun CEG encoding algorithm is very complex, and, in order to update a new pixel, it is often necessary to read and decode many of the pixels that preceded it in the image in order to correctly-encode the new pixel. For these reasons, the Edsun CEG method is not well suited for high speed interactive graphics. Additionally, the Edsun CEG method is not well suited for windowed environments, e.g., Microsoft WINDOWS, since part of the color encoding information for a single pixel may be stored across several pixels, thus making some windowing operations very difficult. In other words, the color compression algorithms employ complex encoding algorithms that do not store a color sample for each pixel at that pixel's location in the frame buffer. It is this lack of a color sample at each pixel location that makes many graphics operations very difficult, thus limiting the interactive response of systems that use encoded frame buffers.

It is desirable to provide a color recovery method and apparatus that is capable of recovering most, if not all, of the color information that is lost during encoding. It is further desirable that the method and apparatus be fast and suited for high speed interactive systems, and that it be useful in windowed environments, yet be simple and inexpensive to implement. The present invention achieves all of these goals.

SUMMARY OF THE INVENTION

A method for recovering lost color information according to the present invention comprises the step of first defining a filter having a shape S which is the same as the shape of the dither matrix and which, at any given time, encompasses (processes) the same number, K, of pixel values as there are dither cells in the dither matrix. Pixel values read from the frame buffer are passed through the filter, which, for a particular pixel P whose color information is sought to be recovered, employs the pixel values embodied by the filter (i.e., in a region of shape S) to recover at least some of the lost color information for the pixel value under consideration. An important feature of the invention is that the effective filter shape is dynamically altered as pixel values are passed therethrough whenever it has been detected that an edge is encompassed within the filter.

According to the invention, weights are accorded to the K ones of the pixel values read from the frame buffer in the region of shape S thereof, including the pixel value corresponding to pixel P of interest. An important feature is that the weights are accorded based upon whether the region S encompasses an edge in the image to be displayed.

According to one embodiment of the invention, each of the K ones of the pixel values is initially accorded an uniform weight. When an edge is encompassed in the region S, the weights of the pixel values corresponding to pixels on a first side of the edge (i.e., the right side of the edge E of FIG. 5B) are uniformly redistributed to the pixel values corresponding to the pixels on a second side of the edge where the pixel P of interest is located (i.e., the left side of the edge E in FIG. 5B). After redistribution, the weights of the pixel values on the first side of the edge are substantially zero. The K ones of the pixel values are then summed together in accordance with their weights and an average value of the summed pixel values is obtained. The result, i.e., the average value, is an illumination value to be used for the pixel P under consideration that, in most cases, includes some of the lost illumination data.

According to a second embodiment of the invention, each of the K ones of the pixel values is initially accorded an uniform discrete unit weight. When an edge is encompassed in the region S, the discrete units of weight of the pixel values corresponding to pixels on the first side of the edge are redistributed, in discrete units, to at least some of the pixel values corresponding to pixels on the second side of the edge. Again, after redistribution, the weights of the pixel values corresponding to the pixels on the first side of the edge are substantially zero.

For a given frame, this process is repeated (using one embodiment or the other) for each pixel in the frame (i.e., for each of the pixel values corresponding to those pixels) until all the pixel values in the frame have been processed.

The disclosed process yields values for all pixels in the image that are substantially similar to the original values provided by the computer system before encoding.

An apparatus for implementing the aforementioned methods is also disclosed.

BRIEF DESCRIPTION OF THE DRAWINGS

FIGS. 2A–2D illustrate the prior art process of encoding color information data by dithering and truncating.

FIGS. 3A–3F pictorially illustrate the method of applying the filter of the present invention to the pixel values stored in the frame buffer to recover lost color information data.

FIGS. 9A–9C pictorially illustrate additional examples of according weights and dynamically adjusting the filter of the present invention in response to detection of edges according to another embodiment of the present invention.

FIG. 10 illustrates an exemplary dither matrix for use in connection with the practice of a particular embodiment of the present invention.

FIG. 11 illustrates the use of fields, in combination with a filter of the shape and size of FIG. 10, to effect Mach band suppression.

FIGS. 13–18 illustrate hardware details of the block diagram of FIG. 12.

FIGS. 19A–19E are graphs illustrating the effect of the present invention on the pixel values stored in the frame buffer in the spatial and frequency domains.

FIG. 20 illustrates a comparison of the performance of the present invention to the prior art.

FIGS. 21A–21F pictorially illustrate the principles of an edge detection method that may be employed in connection with the practice of the present invention.

DETAILED DESCRIPTION OF THE DRAWINGS

Figure 1:
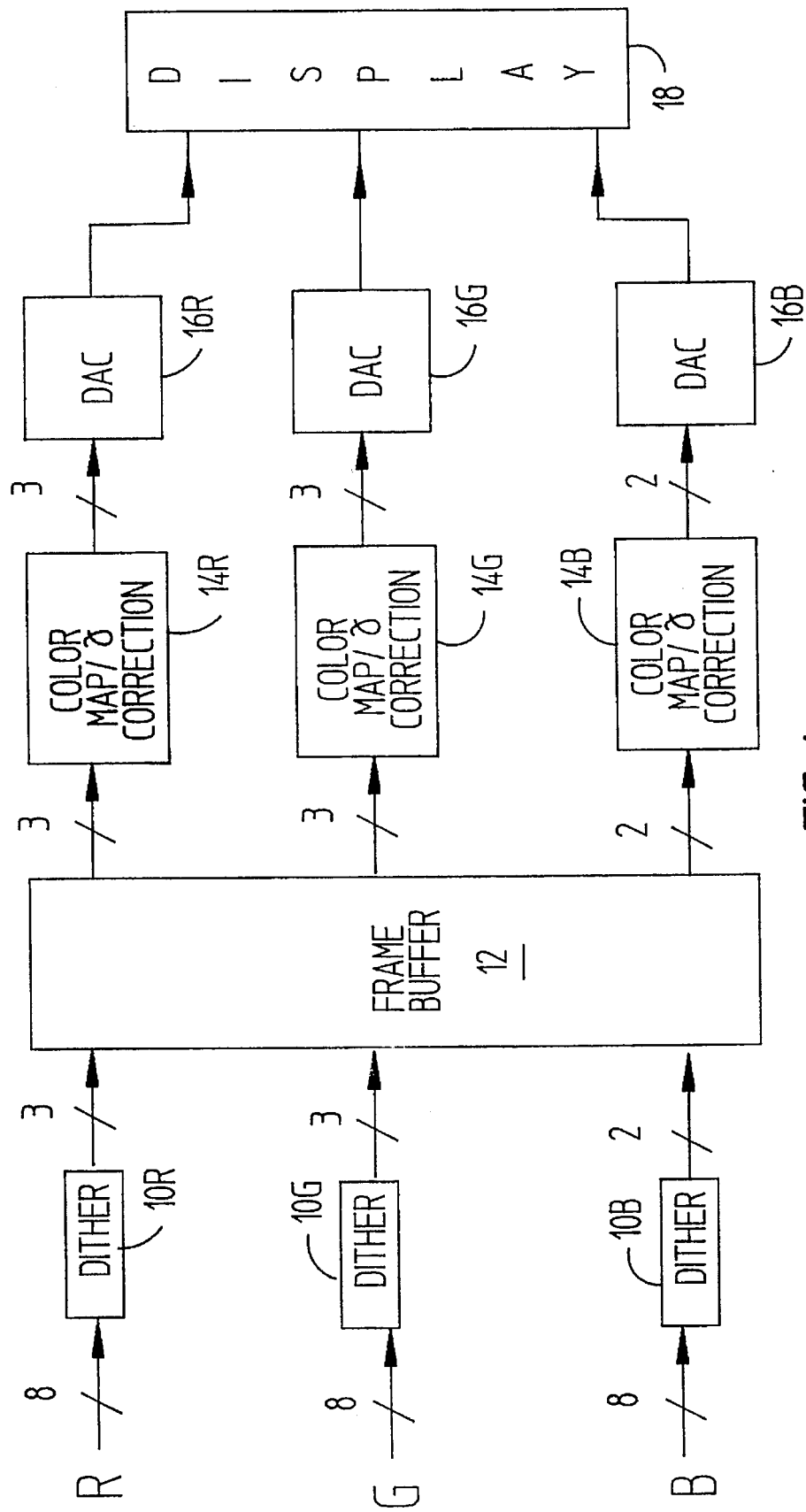
FIG. 1 is a block diagram of an exemplary prior art computer graphics system.

Reference is made to the drawings, wherein like numerals represent like elements.

According to the present invention, groups of pixel values stored in the frame buffer are read out of the frame buffer and filtered, in a filter to be described hereinafter, to recover lost color information. The filter of the present invention preferably has a unique characteristic, i.e., it has an effective shape S that is identical to the shape of the dither matrix used to encode the pixel values stored in the frame buffer. The filter preferably has another characteristic. i.e., at any given time it processes (encompasses) at least the same number, K, of pixel values read from the frame buffer as there are dither cells in the dither matrix. Thus, if the filter of the present invention were to be applied to the example of FIG. 2C to recover lost information data, then the filter preferably would be of the same size and shape as the dither matrix illustrated in FIG. 2B, and at any given time, would process (encompass) at least four pixel values from the frame buffer.

From a conceptual standpoint, the filter of the present invention can be thought of as a region of shape S, having the same shape as the dither matrix, that is indexed across the frame buffer, and, the K pixel values that are encompassed thereby at any given time are the ones that are processed to recover color information for a selected pixel P. This concept is illustrated in FIGS. 3A–3F, though it should be understood that in an actual implementation, the filter per se is not indexed across the frame buffer, but rather the pixel values are read from the frame buffer and passed through the filter. In a preferred implementation, a current and a previous scan line of the pixel values stored in the frame buffer are passed through the filter, and the region of shape S encompasses a portion of, and the K ones of the pixel values are from, both the current and previous scan lines. Thus, the pixel values in the two scan lines are processed by sequentially indexing across sequential regions of shape S of the current and previous scan lines, and upon each indexing, processing the K ones of the encompassed pixel values. After indexing from one side to the other, a next scan line is read out and the process is repeated until the entire frame of data (pixel values) has been processed. As a new scan line is processed, it is saved in the scan line buffer so that it can be used with the next scan line. Saving the scan line buffer allows the pixel data to be read from the frame buffer in a standard fashion. A non-standard reading of the frame buffer may be employed where the frame buffer is read in both the x and y directions simultaneously.

In both embodiments of the invention disclosed herein, the goal is to recover the full precision of the color data originally provided by the computer. It should be understood that while both embodiments strive to achieve this goal, the first embodiment does so more optimally, but may not be well suited for high speed logic applications. The second embodiment strives to approximate the first embodiment and may be somewhat less optimal, but it is much better suited for high speed logic applications. When applied to flat color fields (i.e., no edges are present), both embodiments yield essentially the same results. When the filter encompasses an edge, the two embodiments may yield slightly different results since, as mentioned, the second embodiment is an approximation of the first.

According to the first embodiment of the invention ("averaging method"), a weight is assigned to each pixel value in the region S of the filter, the pixel values are summed together according to their weights, and the average is computed from the sum. The result is assigned to the particular pixel P of interest. When the filter is moved across pixel values representing a flat color field, the weight assigned to each pixel value is "1". (It should be noted that "1" is chosen as the weight for purposes of simplicity only, and that the invention is not limited thereto. Any weight may be chosen, as long as the weights initially accorded to each pixel value in the region S are optimally set substantially equal.) Thus, the value assigned to a particular pixel P of interest in such case will be the average of the pixel values encompassed by the filter at that time. On the other hand, when the filter encompasses an edge, the weights accorded to the various pixel values are redistributed, as set forth hereinafter, and the average is obtained in accordance with the redistributed weights.

Figure 2A:
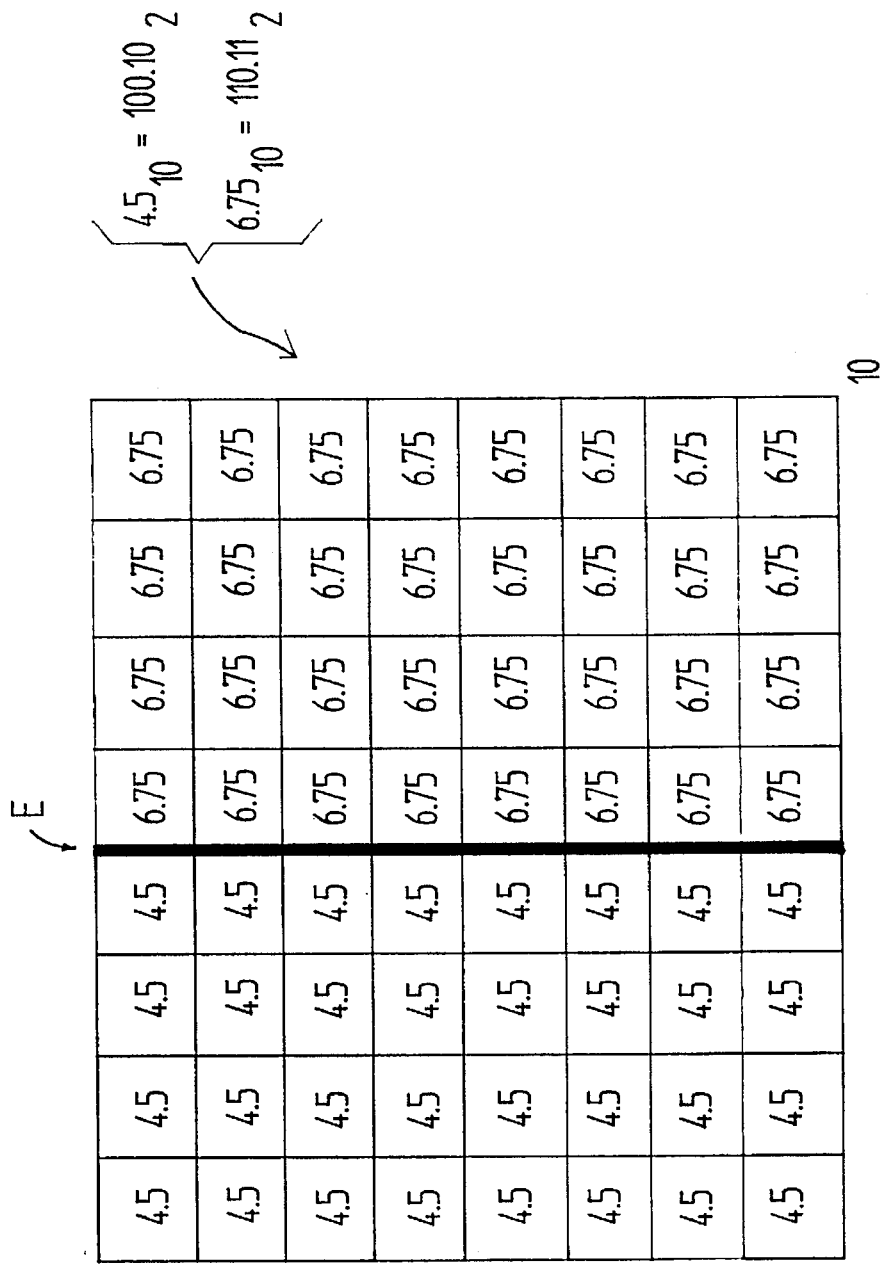
Figure 3B:
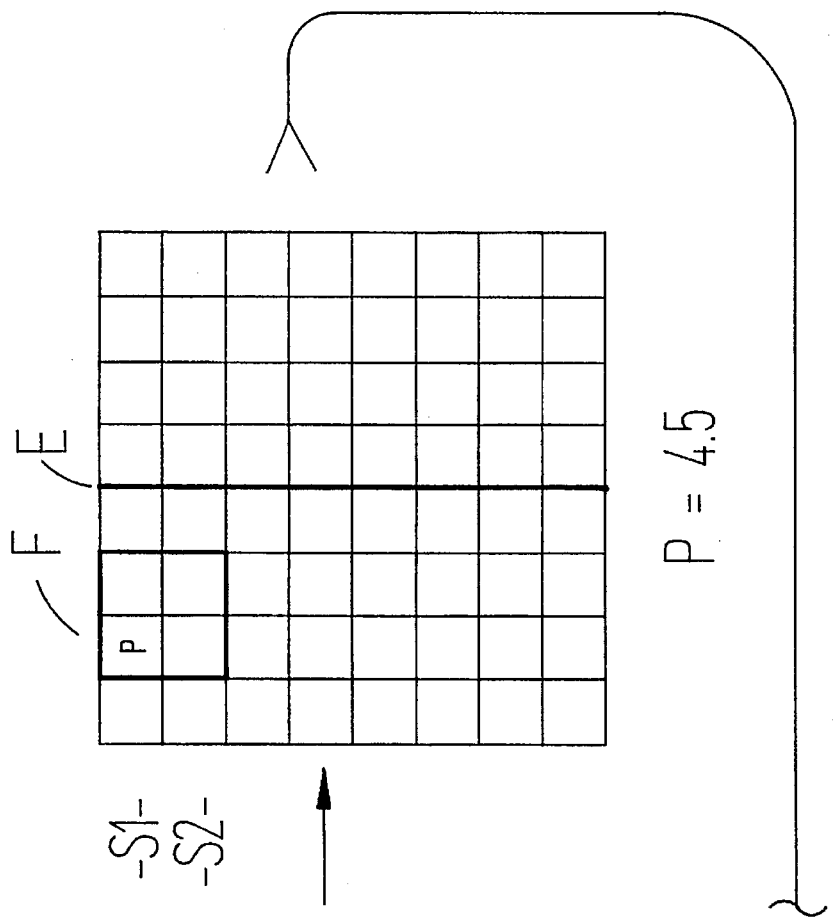
Figure 3A:
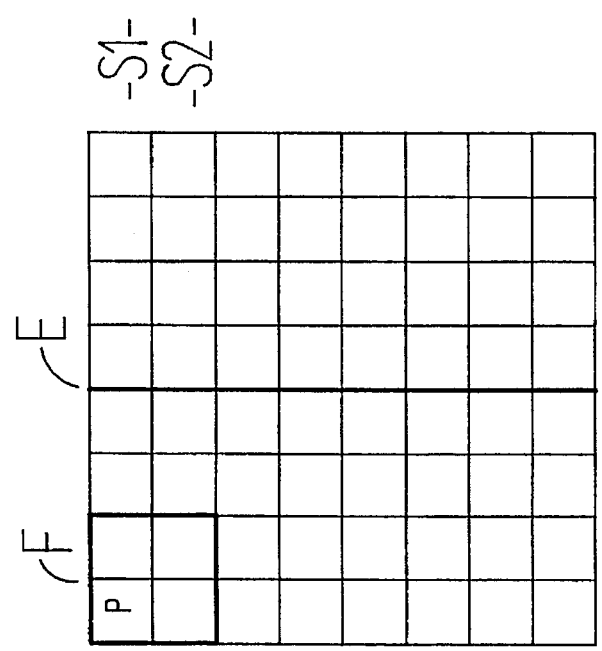

FIG. 3 illustrates application of a filter F of shape 2×2 (i.e., having the same size and shape as the dither matrix of FIG. 2B) to the exemplary pixel values (stored in a frame buffer) of FIG. 2D. As shown in FIG. 3A, at the starting point, the filter F initially encompasses the first two pixel values in the first and second scan lines S1, S2 of the frame buffer. The filter thus encompasses a region S (i.e., 2×2) having K pixel values (i.e., four), where S is identical to the shape of the dither matrix of FIG. 2B and encompasses the same number of pixel values as there are cells in that dither matrix. The particular pixel of interest is labeled P. Thus, the filter F also encompasses the pixel P of interest.

Referring to FIG. 2D, the pixel values encompassed by the filter F, when in the position shown in FIG. 3A, are 4,5 (S1) and 5,4 (S2), respectively. It will also be seen from FIG. 3A that no edge is encompassed by the filter F at this time. Each of the pixel values encompassed by the filter F has been accorded uniform weight, i e., "1" and since no edge is present, a straight sum of these values may be computed. It will be seen that the value of that sum is 18. The average of this sum is 18/4, or 4.5. It will be seen that the average value is identical to the original value from FIG. 2A for the pixel P of interest. Thus, the lost color information for this pixel has been recovered.

The filter F is next indexed to the right by one pixel value, and the process is repeated, as shown in FIG. 3B, to again recover the original pixel value, 4.5, and then again, as shown in FIG. 3C, to again recover the original pixel value 4.5. When the filter F is next indexed to the position shown in FIG. 3D, it encompasses the edge E in the image, as shown in FIG. 3D.

Figure 4A:
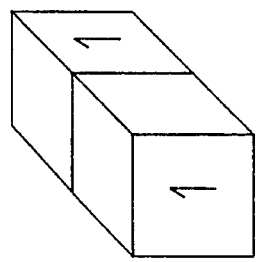
FIGS. 4A and 4B and 5A and 5B pictorially illustrate examples of according weights and dynamically adjusting the filter of the present invention in response to detection of edges.

The filter F, as applied in FIGS. 3A, 3B and 3C, can be schematically represented as shown in FIG. 4A, where uniform weighting, i e, "1" was applied to each pixel value to compute a sum and average value for the pixel P of interest. However, computing sums and averages as thus far described when the filter F encompasses an edge E (e.g., FIG. 3E) would result in an erroneous value for the selected pixel P. For example, if uniform weighting (i.e., the weight distribution of FIG. 4A) were used to compute the sum and average value of the pixel P of FIG. 3E, then a sum of 22, and an average of 22/4=5.5 would result. It can be seen, by reference to the corresponding value in FIG. 2A, that this result is not only erroneous, but differs substantially from the original value of 4.5.

In accordance with the present invention, when the filter encompasses an edge, as shown in FIG. 3D, the weights are accorded to the pixel values based upon which side of the edge the pixel values are located (relative to the particular pixel P under consideration). In FIG. 3D, the pixel P under consideration is on the left hand side of the edge E. The two pixel values on the right hand side of the edge are accorded "0" weight. The two pixel values on the left hand side are accorded weight "1". The sum of the pixel values, when these weights are taken into account, is 9, and the average is 9/2=4.5. As can be seen from FIG. 2A, in this particular example, this is exactly the original value for the pixel P under consideration in FIG. 3D. It should be noted that this example assumes high edge detection sensitivity, i.e., that edge detection will detect an edge between the pixels having the color values 5 and 6 as shown in FIG. 2D. The enhanced edge detection method discussed herein would detect such an edge. However, less optimal edge optimal detection may not detect that the color values 5 and 6 from FIG. 2D indicate an edge, and in such case, the color value 6 may also be included in the calculation, resulting in an average of (5+4+6)/3=5 for the pixel P under consideration in FIG. 3D.

It will be appreciated that the first embodiment thus involves using the accorded weights in taking pixel values into account. That is, weights are effectively redistributed to effectively to compute the average.

In FIG. 3E, no edge is encompassed by the filter, so the sum (and average) are computed as in FIGS. 3A–3C.

FIG. 3F illustrates an example where application of the present invention does not yield recovery of exactly the original pixel value from FIG. 2A. In FIG. 3F, the filter has been indexed to the last location of the scan line (i.e., the edge of the image). There, the recovered value is 7, whereas the corresponding value from FIG. 2A is 6.75. Although the recovered pixel value is not exact, it is close, because it relies on the color sample at the pixel P as being a reasonable sample.

Figure 4B:
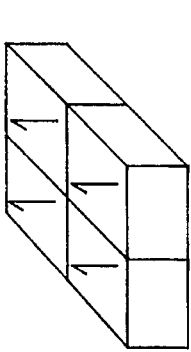

Another way of considering application of the first embodiment of the invention is as follows. When the filter encompasses an edge, as in FIG. 3D, the weights of the pixel values on the opposite side of the edge from the pixel P of interest are uniformly redistributed to the pixel values on the same side of the edge as the pixel P of interest. Thus, in the example of FIG. 3D, the weights of the pixel values on the right side of the edge E are uniformly redistributed to the pixel values on the left side of the edge E, so that, after redistribution, the pixel values on the right side of the edge E have zero weight. After redistribution, the two pixel values on the left side of the edge E each have a weight of "1", but these weights have more significance than they did previously because, as shown below, the magnitude of the divisor for computing the average decreases. The effective filter so applied, after redistribution of the weights, is schematically illustrated in FIG. 4B where, essentially, the effective filter shape has been altered to account for the redistribution. A weighted sum of the pixel values encompassed by the filter, using the new weights, is then computed. Thus, in the case of FIG. 3D, the weighted sum of the corresponding pixel values of FIG. 2D is: (1×5)+(1×4)+(0×6)+(0×7)=9. The average is 9/2=4.5.

Figure 5A:
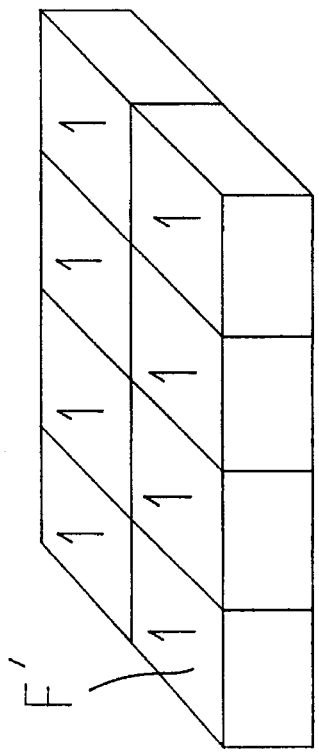
Figure 5B:
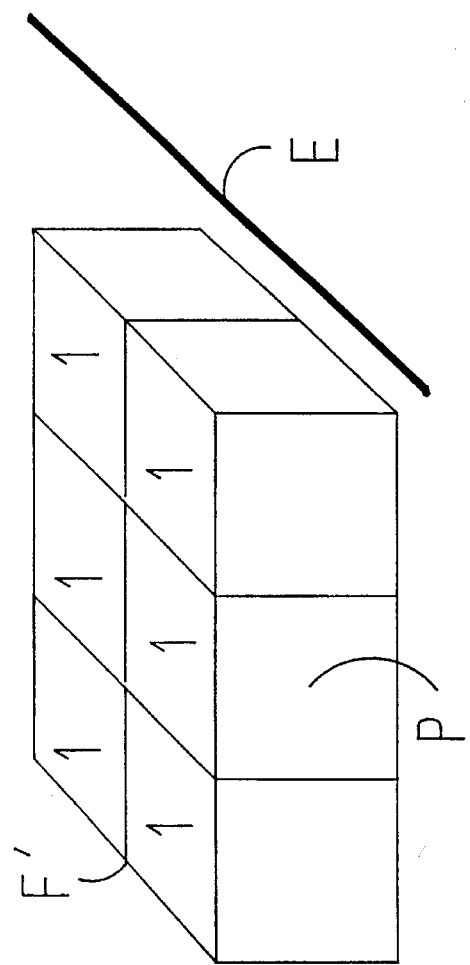

FIGS. 5A and 5B pictorially illustrate this other way of considering the concept. For purposes of explanation, the filter F' of FIGS. 5A and 5B is larger than the filter F employed in connection with FIGS. 3A–3F. The filter of FIG. 5A would be applied in the same manner as described in connection with FIGS. 3A–3C when the color field is flat, i.e., no edges have been encountered. As shown, a weight of "1" would initially be accorded to each pixel value. However, as shown in FIG. 5B, when an edge E has been encountered, it is preferred that the weights initially accorded to the pixel values on the right side of the edge E (i.e., the side opposite the pixel P of interest) be evenly distributed over the pixel values on the left side of the edge E. Thus, in FIG. 5B, the filter shape is effectively altered by removing two units of weight. Thus, each of the remaining six pixel values will have more significance than they previously did since, after redistribution, each will account for ⅙ of the total weight, whereas before distribution, each accounted for ⅛ of the total weight. The value for the pixel P under consideration is then computed as previously described.

As previously mentioned, the filter is indexed through the frame buffer, on a scan line by scan line basis (actually, the pixel values are read from the frame buffer and passed through the filter) until all pixel values have been processed as above described.

From the example of FIGS. 2 and 3, it will be appreciated that processing the pixel values as described in connection therewith results in recovery of the 2 binary digits that were lost after dithering and before storage in the frame buffer. In other words, the 2 binary digits after the binary point (FIG. 2A) are recovered. It has been discovered that, as a general rule, the maximum number of recoverable binary digits is directly related to the filter size. In particular, a filter that is of a size/shape that encompasses at least $2^N$ pixel values is capable of recovering up to N binary digits. Of course, as mentioned, the filter size/shape should preferably be identical to that of the dither matrix. Thus, it is the dither matrix size/shape that determines the filter size/shape, and hence the maximum number of recoverable bits. In the examples of FIGS. 3A–3F, the filter encompasses 4 or $2^2$, pixel values and thus the maximum number of recoverable binary digits is 2. The filter F' of FIG. 5A encompasses 8, or $2^3$, pixel values, and would therefore be capable of recovering up to 3 binary digits. It should be understood that the filter may encompass more than $2^N$ pixel values, but the maximum number of recoverable bits would be N.

Thus, to summarize, the first embodiment of the invention involves the following steps:

(i) dithering the color information data generated by the computer (e.g., the data in FIG. 2A), on a pixel-by-pixel basis using a dithering technique. However, as mentioned, the dither matrix should preferably have the same effective shape/size as the region that the filter is applied over, and the size of the dither matrix (and hence the filter) must encompass enough pixel values to support the number of additional binary digits and hence additional colors, that are to be recovered. For example, to recover 5 additional bits, (i.e., recovery of an 8-8-7 image from a 3-3-2 frame buffer), then the dither matrix must contain $2^5$, or 32, dither cells. An 8-8-7 image yields $2^{23}$, or over 8 million, colors. Note that the requirement that the dither matrix have the same effective shape as the filter region does not imply that the two be screened aligned. It only means that if, for example, the filter encompasses a region having a shape of 4×8 pixel values, then the dither matrix should also be of shape 4×8;

(ii) performing edge detection and filtering pixel values according to whether edges are encompassed by the filter. Note that the filter must be able to detect edges in the data that is read from the frame buffer. Edge detection is discussed hereinafter. The filter shape is then dynamically altered to account for those edges, as above described;

(iii) employing only the pixel values on the same side of the edge as the pixel of interest to compute a sum, based upon accorded weights, as above described; and, (iv) dividing the sum of the pixel values by the number of pixel values used to compute the sum when.

Figure 6:
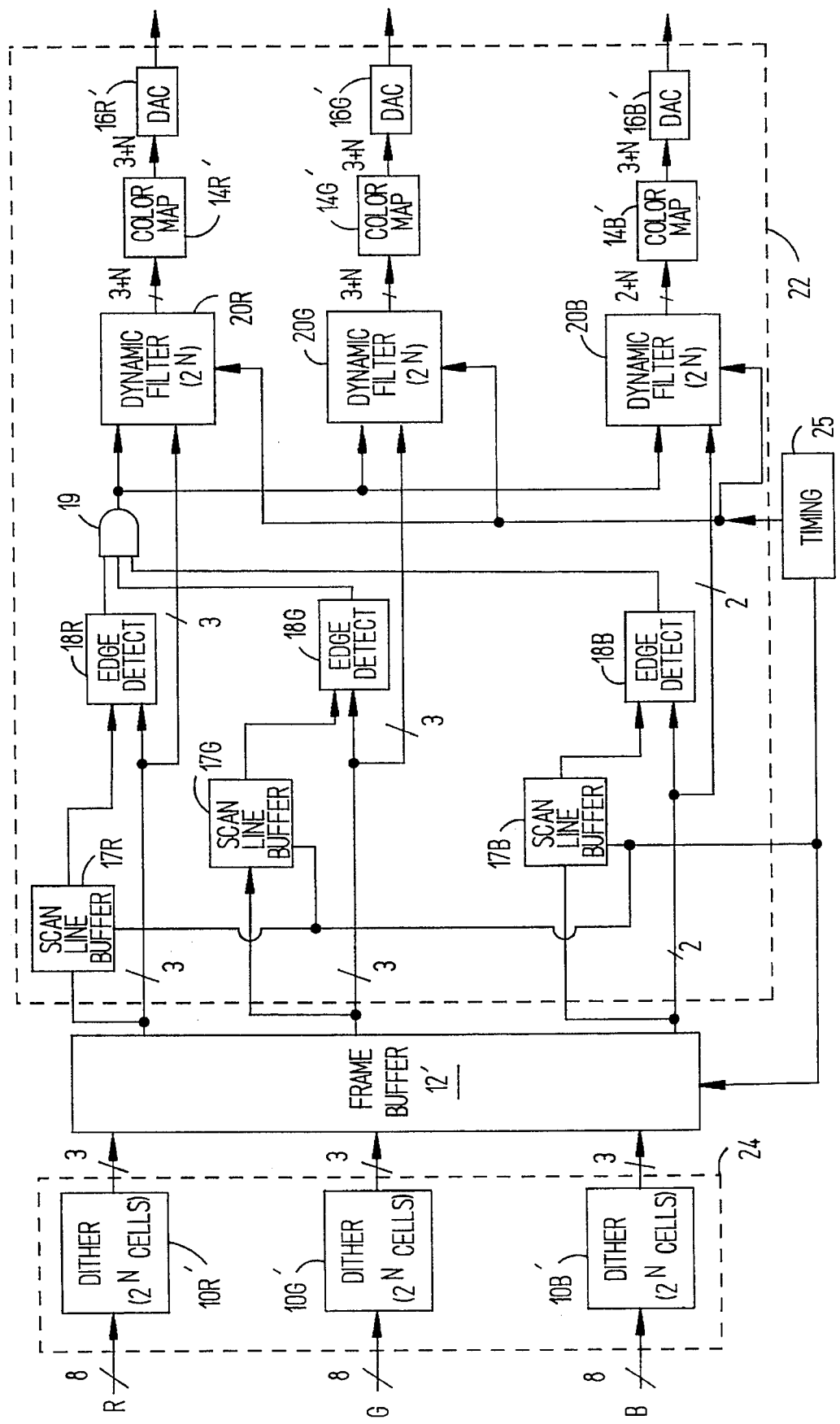
FIG. 6 is a block diagram illustrating one hardware implementation of the present invention.

FIG. 6 illustrates, in block diagram form, a hardware implementation of the invention in the context of the computer graphics system of the type of FIG. 1. As shown, the color data generated by the computer is provided to a plurality of dither circuits 10R', 10G', 10B'. These may be embodied as part of a drawing processor 24. As shown, dither matrices having shape S are employed for dithering. The dithered, quantized data is stored in the frame buffer 12'. Data is read from the frame buffer 12', on a scan line-by-scan line basis, and provided to edge detect circuits 18R, 18G and 18B. The RGB components of the scan line are stored in respective ones of a scan line buffer 17R, 17G, 17B and supplied to its respective edge detector. The function of the edge detect circuits is to determine whether an edge is encompassed in a current portion of a scan line under consideration by the filter. The output of the edge detect circuits is provided, via AND gate 19, to respective dynamic filters 20R, 20G, 20B which function as above (or below) described. The AND gate 19 combines edge detection for all three R, G, B channels and enhances edge detection. Each of the dynamic filters 20R, 20G, 20B also receives the same portion of the scan line (pixel values) that was provided to the respective edge detect circuits. The output of the dynamic filters 20R, 20G, 20B, which is a pixel value having the recovered color data, may be supplied to a respective one of a color map 14R', 14G', 14B' which perform the same function as the color maps 14R, 14G, 14B of FIG. 1 The color maps 14R', 14G', 14B' may include optional color correction functions, such as the well known gamma correction function, or a function to correct small color errors resulting from dithering It should be noted that the color maps 14R', 14G', 14B' are optional. The output of the color maps 14R', 14G', 14B' (if provided) is provided to a respective one of a digital to analog converter 16R', 16G', 16B' for driving the display device.

As shown, data is read into and out of the frame buffer 12' and the scan line buffers 17R, 17G and 17B. The scan line buffers 17R, 17G, and 17B, the edge detectors 18R, 18G, 18B and the dynamic filters 20R, 20G and 20B operate in accordance with timing signals provided by timing circuitry 25.

In one implementation of the invention, the edge detect circuits 18R, 18G, 18B, the scan line buffers 17R, 17G, 17B, the dynamic filters 20R, 20G, and 20B, the color maps 14R', 14G', 14B' and the digital to analog converters 16R', 16G' and 16B' may be embodied in a single integrated circuit that is remote from the drawing processor 24, but this is not required, i.e., they could be integrated in the same chip.

Figure 7:
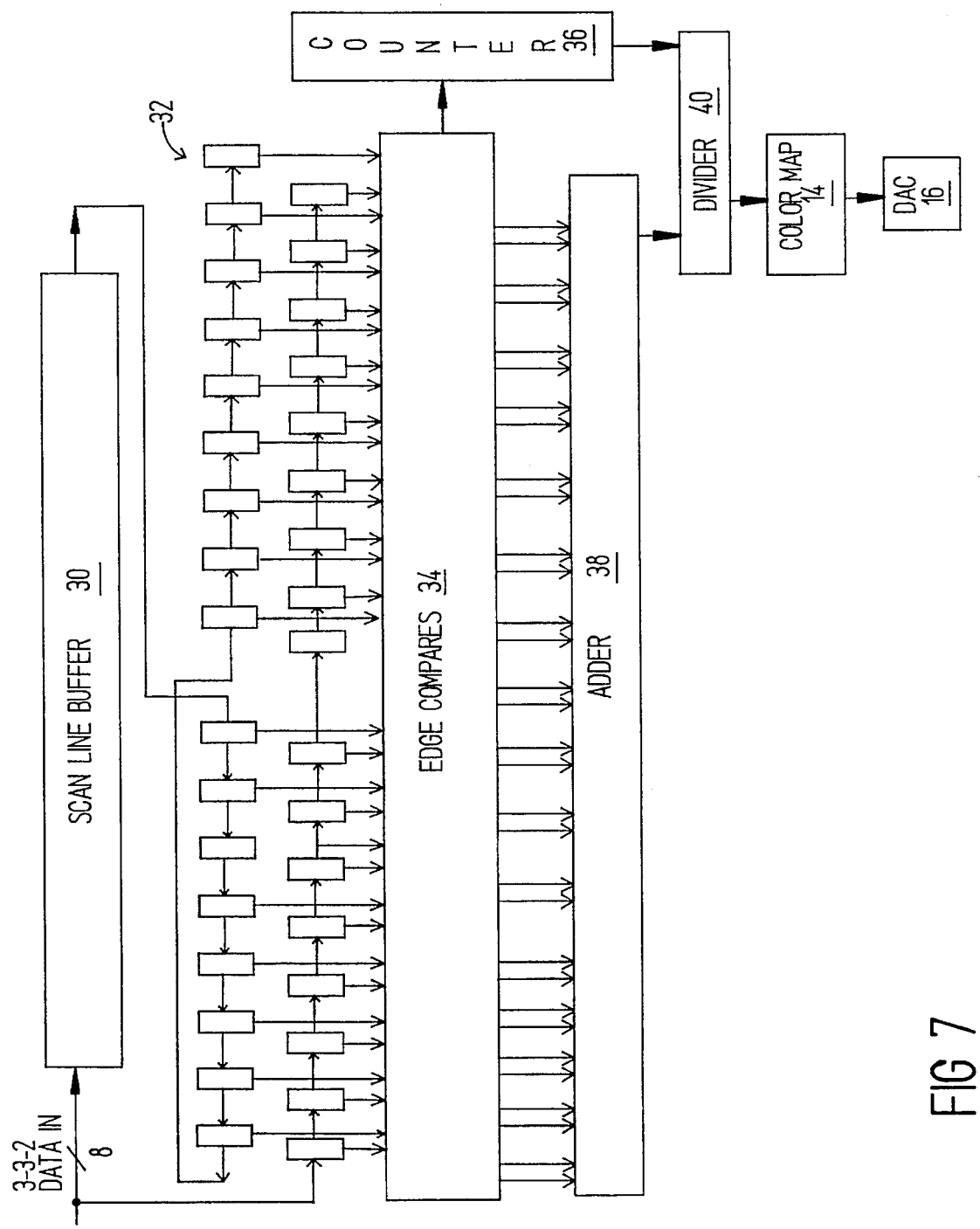
FIG. 7 is a block diagram illustrating one hardware embodiment for implementing portion 22 of FIG. 6.

FIG. 7 is a block diagram illustrating one hardware embodiment for implementing portion 22 of FIG. 6. As shown, the 3-3-2 format data for a current scan line is read from the frame buffer 12 into a scan line buffer 30. Thus, the current and previous scan lines are available for processing as before described. Block 34 performs the function of determining whether an edge is encompassed within the filter region. This may be performed simply by comparing the difference between adjacent pixel values to a threshold. (Note: the sensitivity of the edge detection will depend upon dither quantization. It may not be possible to detect edges if the magnitude of the change indicating the edge is lost in the dither noise. However, if the color data is quantized to N bits, then the edge detection may be sensitive to N+1 bits using the enhanced edge detection method disclosed herein). Block 36 communicates with block 34 to maintain a count of the number of pixel values found to be on the same side of the edge as the pixel P of interest. Block 38, which is an adder (or, in one implementation disclosed herein, a tree of adders), adds together all of the pixel values that were found to be on the same side of the edge as the pixel of interest. The result of the addition from block 38, and the result of the count from block 36, are provided to a divider circuit 40 which performs a division, as before described to arrive at the average value for the pixel under consideration. This is provided to the color map 14, and subsequently to the DAC 16 as before described.

Figure 8A:
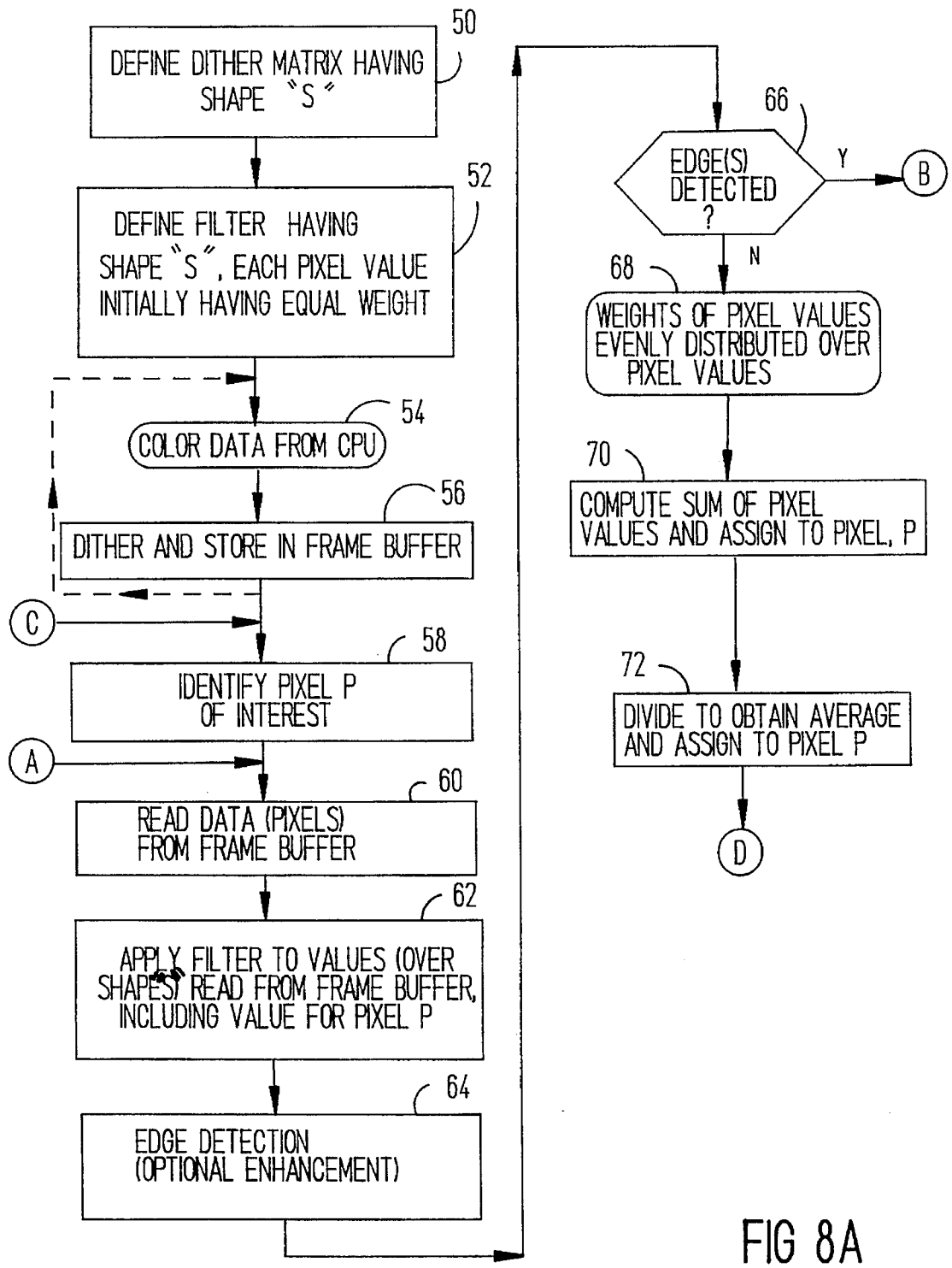
FIGS. 8A and 8B are a flowchart illustrating one embodiment of the method of the present invention.
Figure 8B:
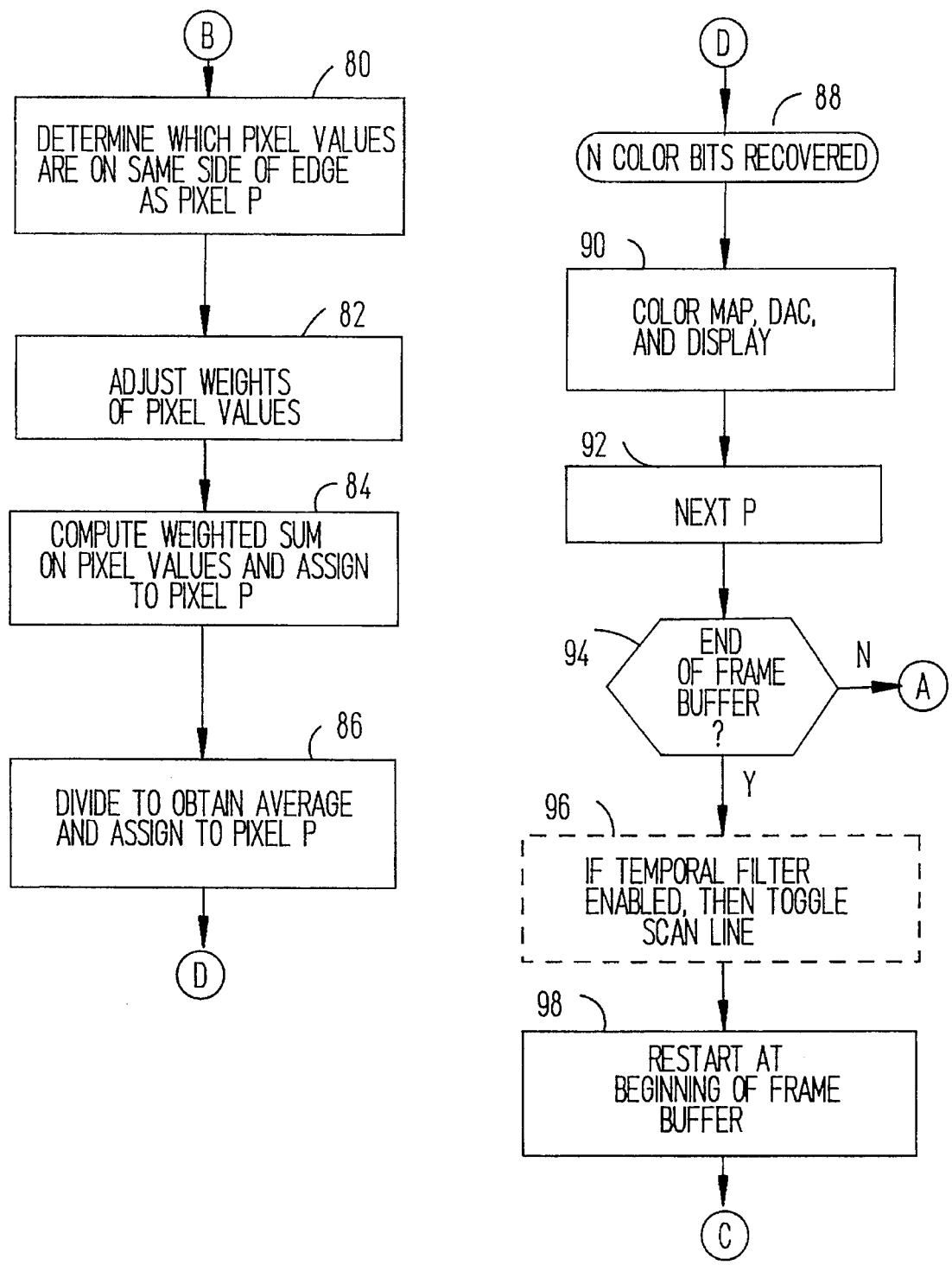

FIGS. 8A and 8B are a flowchart illustrating the first embodiment of the method of the present invention. (It should be noted that, with the exception of steps 68, 72 and 86, the flowchart of FIGS. 8A and 8B also generically describes the second embodiment of the invention). As shown at step 50, a dither matrix having shape S is defined. Next, as shown at step 52, a filter having the same size and effective shape as the dither matrix is defined, and the filter is initially set so that each pixel value that it will encompass will initially be accorded an equal unit weight, e.g., "1". As shown at steps 54 and 56, the color information data for each of the color components generated by the computer is dithered, and stored in the frame buffer 12' as before described. If desired, gamma correction may be performed upon the pixel values prior to dithering.

At step 58, the pixel P of interest is identified. At step 60, a scan line is read from the frame buffer 12' to the scan line buffer 30 and to the registers 32. At step 62, the filter is applied to the current and previous scan lines in the manner before described. At steps 64 and 66, a determination is made as to whether the filter encompasses an edge. As previously mentioned, this may be performed simply by comparing the difference between two adjacent pixels to a threshold. An optional enhanced detection method is described hereinafter. If it has been determined that no edges are encompassed by the filter, then the weights remain evenly distributed over all of the pixels encompassed by the filter, i.e., the weights are not redistributed, as shown at step 68. At step 70, the pixel values are summed according to their weighting, as described above, and depending upon the scaling method selected. The sum of the pixel values is then divided, as above described, to obtain an average value for the pixel P of interest, as shown at step 72.

If, at step 66, it was determined that an edge is encompassed by the filter, then steps 80–86 are performed to compute a value for the current pixel P. As shown at step 80, a determination is made as to which pixel values are on the same side of the edge as the pixel P of interest. At step 82, the weights of the pixel values are adjusted as above (or below) described (e.g., the weights of the pixel values on the opposite side of the edge from the pixel P of interest are redistributed to those pixel values on the same side of the edge as the pixel P of interest. Then, as shown at step 84, the weighted sum of the pixel values is computed as above (or below) described and assigned to the pixel P of interest. As shown at step 86, a division is carried out, as above described, to the resulting sum to obtain the average for the pixel P under consideration.

After completion of the functions illustrated in the relevant ones of steps 70, 72, 84, 86, the functions performed at steps 88 et seq. are performed. Specifically, as illustrated at block 88, once the functions at any of steps 70, 72, 84 or 86 have been performed, a pixel value with up to N additional bits of color information is recovered for the pixel value corresponding to the pixel P currently under consideration. The result may be passed through a color map (optional), then to DAC 90 and to the display, as before described. Thereafter, a next pixel P is selected, step 92, as conceptually shown in FIG. 3. As shown at step 94, a determination is made as to whether the end of the frame buffer has been reached. If the end of the frame buffer has not been reached, then steps 60 et seq. are repeated until the end of the frame buffer has been reached. Once the end of the frame buffer has been reached, steps 58 et seq. are repeated from the beginning of the frame buffer, as shown at step 98.

In accordance with one embodiment of the invention, an optional step may be performed prior to step 98, i.e., restarting at the beginning of the frame buffer. This optional step is illustrated at block 96 and is referred to herein as "temporal filtering". The temporal filtering option of the present invention is described in detail hereinafter. For now, it suffices to say that if the temporal filtering option has been enabled, this alters the scan lines over which the filter will be applied on the next pass. This will become evident hereinafter.

In the first embodiment of the invention previously described, the pixel values that were found to be on the opposite side of the edge from the pixel P of interest (i.e., those that failed the edge compare test) had their weights uniformly and evenly distributed over the pixel values on the same side of the edge as the pixel P of interest (i.e., those that passed the edge compare test). While this represents a most preferred embodiment, its implementation may involve considerable expense since it requires a divider circuit running at the pixel clock speed to evenly divide those weights among the various pixel values. According to the second embodiment ("sum method"), however, no such divider is needed. According to the second embodiment, the weights of the pixel values that failed the edge compare test are re-distributed to those that did pass the edge compare test in a somewhat less optimal fashion than in the first embodiment.

In particular, in accordance with the second embodiment, the weights corresponding to the pixel values that failed the edge compare test are not necessarily evenly and uniformly distributed over those that did. Rather, the weights of the pixel value that failed are distributed, by a technique referred to herein as "tossing", wherein the unit values of weight corresponding to the pixel values that failed the edge compare test are simply "tossed" over to the pixel values that passed. This concept is illustrated in FIG. 9A. In FIG. 9A, the unit weights corresponding to the pixel values that failed the edge compare test (shown in the dotted lines labelled A and B) are simply "tossed" over to ones of the pixel values that passed (shown in FIG. 9A by C and D). Thus, in both embodiments, the total weight of the pixel values that passed the edge compare test (after redistribution) is the same, but in the first embodiment the weights are evenly and uniformly distributed over all of those pixel values (e.g., FIG. 5B), whereas in the second embodiment, this is not necessarily the case.

According to one preferred implementation of both embodiments of the invention, there is storage in block 22 (FIGS. 6, 7 and 12) for a single scan line of video data. This forces the height of the dither cell, and hence the height of the filter to be two scan lines high (i.e., in the Y direction). That is, with reference to FIG. 7, the previous scan line data is stored in the scan line buffer 30, and the current scan line data is stored in the registers 32 and input into scan line buffer 30.

Since true color images show Mach banding artifacts if there are insufficient colors used in the display (as would be the case with 3-3-2 format data), it is desirable to recover at least 8-8-7 color data for displaying the image. This means that, since the stored image in the frame buffer 12' is in 3-3-2 format, the dither matrix will need 32 cells (i.e., 5 additional bits are needed to get from 3-3-2 to 8-8-7, and $2^5=32$). Therefore, one possible shape of the dither matrix is, 2×16, as shown in FIG. 10.

In the 2×16 dither matrix of FIG. 10, the values have been distributed in a reasonable fashion, in accordance with prior art techniques. (The 0–31 decimal values in the dither matrix of FIG. 10 are actually 5 binary bits; these would be added to an 8 bit color word, checked for overflow, then truncated, as is well known in the art.) It will be appreciated that the 2×16 dither matrix of FIG. 10 actually comprises one 2×4 sub-matrix (labelled with M1's), a center 2×4 filter region (labelled with x's) and one 2×8 sub-matrix (labelled with M2's). This is because, in this implementation, weight redistribution is performed on a pixel by pixel basis using tossing within the center 2×4 filter region, and on a block by block basis using the regions encompassed by the sub-matrices labeled with the M1's and M2's. This block by block redistribution is referred to as Mach band killing herein because Mach bands are visually apparent when the low order bits of the full precision color are not recovered across a flat field. This block by block redistribution recovers the low order bits in a flat field. As an edge is approached, the weights of these blocks are redistributed to the blocks nearer the edge where weight redistribution is more effectively done on a pixel by pixel basis. The pixel by pixel redistribution of weights is performed on the center 2×4 filter region encompassing the pixel value corresponding to the current pixel P under consideration (represented by the large "X" in FIG. 11). Note that each of the RGB (or YUV) components may use a separate matrix, and the pixel P of interest "X" in FIG. 11 may be more symmetrically placed.

It was previously shown that, according to another embodiment of the invention, when an edge is encountered, the weights corresponding to pixel values that failed the edge compare test are tossed to the pixel values that passed. However, if two edges are encountered, the weights can end up being sent to the pixel value corresponding to the pixel P of interest. Examples of the weights being allocated to the pixel values for the pixel P of interest are shown in FIGS. 9B and 9C. In each of these figures, two edges E1 and E2 are encompassed in the filter region. FIG. 9B illustrates a less than optimal "tossing" of the weights, whereas FIG. 9C illustrates a more optimal tossing. However, in FIG. 9C, the edges are only one pixel apart, whereas in FIG. 9B, the edges are two pixels apart. Thus, achieving optimal "tossing" depends upon the geometry of the region that passes each pixel compare, and the ability of that region to have the weight from the failing region redistributed in a uniform fashion, while maintaining the requirement (of this implementation) that the weights be tossed in equally sized increments. (Note the eight blocks in each of the FIGS. 9A–9C). In either event, it is desired that the weights be as evenly distributed over the pixel values that passed the edge compare as possible. Obviously, the contribution that neighboring pixel values will have upon the pixel value for the pixel P of interest depends upon the weight allocated to those neighboring pixel values. In order to allow neighboring pixel values to always have a meaningful contribution to the pixel value for the pixel P of interest, the filter should approximate a uniform distribution of weight over the region that passes the edge compare test. Then, the sides of the matrix that are constructed using a dither matrix of the type of FIG. 10 (i.e., the portions labelled M1 and M2 in FIG. 11) may be used for Mach band suppression. Note that a 2×4 filter can only recover 3 bits of color information, so an image constructed with 3-3-2 format color data would never be better than an image constructed with 6-6-5 format color data without Mach band suppression. Even though an image constructed with 6-6-5 format color data can display 128K colors, it may still have very noticeable Mach bands.

According to the invention, Mach band suppression is achieved as follows. Part of the pixel values encompassed by the center 2×4 filter region (i.e., the x's in FIG. 11) are summed up and then compared to the sum of the pixel values encompassed by the M1 sub-matrix of FIG. 11. This operation is carried out in block 110 of FIG. 12. The result of this operation is then compared to the sum of the pixel values encompassed by the M2 sub-matrix of FIG. 12. This operation is carried out in block 114 of FIG. 12. The sum all of the pixel values encompassed by the center 2×4 filter region will be referred to as the "color value" of that region.) If the two sums are close (i.e., they are within a few lowest order bits of the full precision 8 bit color word, then it may be assumed that they are from the same surface. In such case, the color value of the center 2×4 filter region may be added to the pixel values encompassed by that portion of the matrix of FIG. 11 corresponding to the Mach band killing region (i.e., the portion having the M1's and M2's). If the two are not within a few lowest order bits of the 8-bit color word, then it may be assumed that there is a major color change between the two regions (i.e., the center 2×4 filter region and the Mach band killing region) and the color value of the center 2×4 filter region may be doubled. Doubling the color value of the center 2×4 filter region has the effect of replacing the Mach band killing region with a copy of the center 2×4 filter region. The net effect is that all pixel weights encompassed by the center 2×4 filter region are effectively doubled.

According to one implementation of the invention, Mach band killing is actually a two-level process. First, the pixel values encompassed by the center 2×4 filter region are compared to those encompassed by a 2×4 Mach band killing region 1 (i.e., the part of the matrix of FIG. 11 having the M1's). The total (a sum of the first 16 weights from the center 2×4 filter region and the M1's) of this first level of Mach band killing is then compared, in the same manner, to the pixel values encompassed by the 2×8 Mach band killing region 2 (i.e., the portion of the matrix of FIG. 11 having the M2's). Note that the final result of Mach band killing will always have the equivalent of 32 weights but may be in any one of the following forms:

(i) the weights of the pixel values encompassed by the center 2×4 filter region×4;

(ii) the weights of the pixel values encompassed by the center 2×4 filter region×2, plus the weights of the pixel values encompassed by the first Mach band killing region (the M1's)×2;

(iii) the weights of the pixel values encompassed by the center 2×4 filter region, plus the weights of the pixel values encompassed by the first Mach band killing region (the M1's), plus the weights of the pixel values encompassed by the second Mach band killing region (the M2's); or, (iv) the weights of the pixel values encompassed by the center 2×4 filter region×2, plus the weights of the pixel values encompassed by the second Mach band killing region (the M2's).

It will thus be appreciated that the Mach band killing regions are employed as a coarser way to redistribute the weights. The Mach band killing regions do suppress Mach bands, but largely in regions where the Mach bands are most visible, i.e., in a large flat color field. In such a case, the entire 2×16 filter will be like that of FIG. 5A. That is, the filter will be uniform. As edges are approached, the filter will begin to "collapse", as shown in FIGS. 9B and 9C. As the filter collapses, however, it is desirable to distribute the remaining pixels as evenly as possible, e.g., as in FIG. 9C.

Note that as the pixels in the Mach band killing regions fail the edge compare test, they are discarded, but in doing so, the pixel values corresponding to the pixels that passed the edge compare test are doubled. Note also that the pixel values corresponding to the pixels that passed may have an uneven distribution of weight, such as shown in FIG. 9A. However, doubling the weight distribution of that shown in FIG. 9A is a better distribution than placing the entire weight onto the pixel of interest.

In sum, the goal of the present invention is to recover a full precision color value. If a full precision color value is recovered, then Mach bands will not be visible by definition, given that the full precision value that was started with, typically 8–10 bits, is sufficient. The Mach band killing regions assist in obtaining a more uniform distribution of the weights when the filter encompasses the edge.

Figure 12:
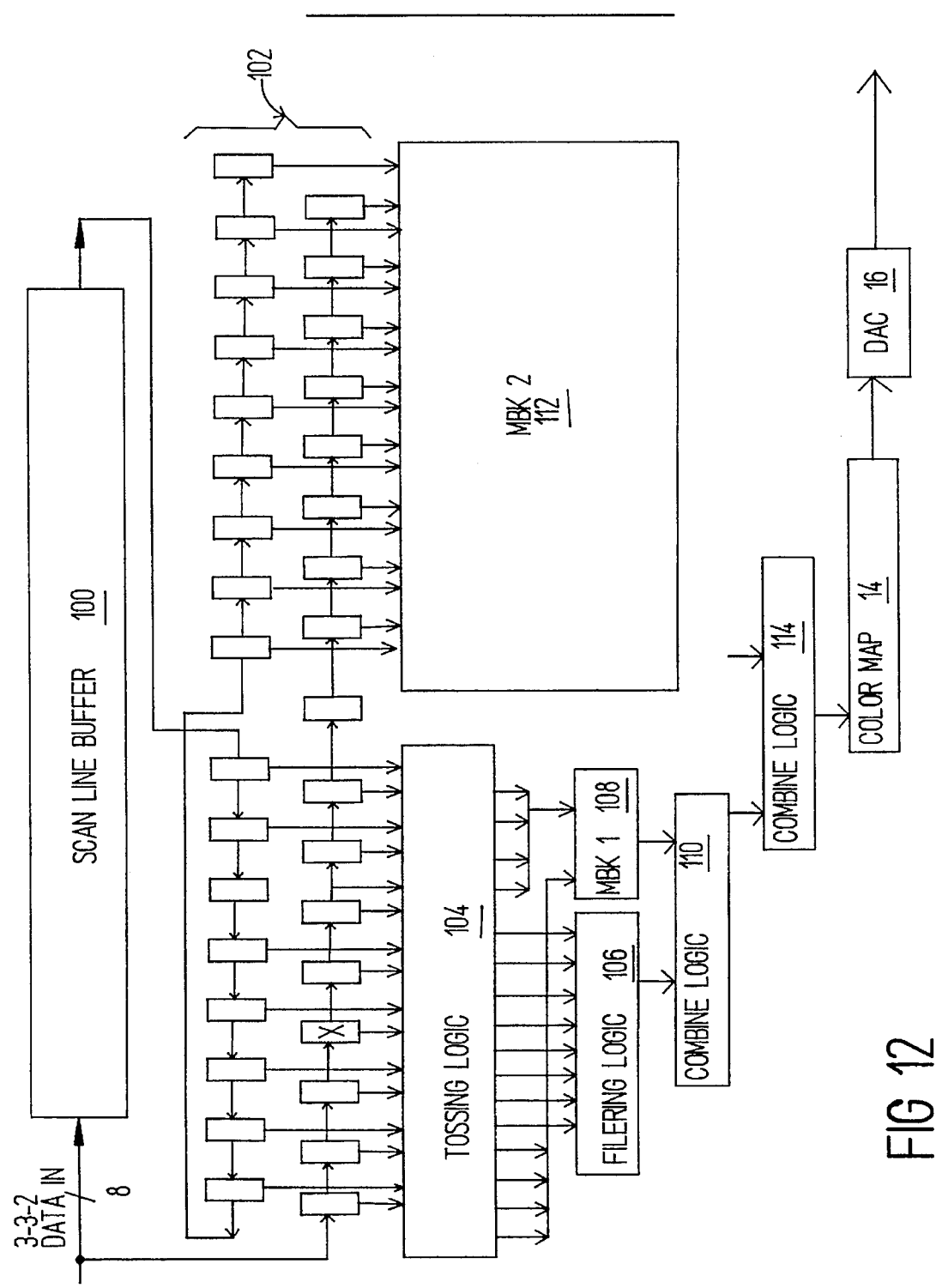
FIG. 12 is a block diagram illustrating another hardware embodiment for implementing portion 22 of FIG. 6.

FIGS. 12–18 illustrate one hardware implementation of the embodiment of the invention that employs the "tossing" method of redistributing unit weights and that performs Mach band killing as above described. In particular, FIG. 12 is a simplified block diagram of such a hardware circuit, and FIGS. 13–18 illustrate details of its implementation. As shown in FIG. 12, a scan line buffer (preferably 1024 pixels long) is provided. The input to the scan line buffer is the data read from the frame buffer 12'. The serial output of the scan line buffer 100 is provided to a set of cascaded registers 102, some of which communicate with tossing logic 104, and others of which communicate with a Mach band killer circuit (MBK2) 112. (Note the MBK2 112 corresponds to the second Mach band killing region described above.) The tossing logic 104, which tosses the unit weights as above described, in turn, communicates with filtering logic 106 and another Mach band killer (MBK1) 108, as shown. (Note the MBK1 108 corresponds to the first Mach band killing region described above.)

The filtering logic 106 computes a weighted sum of the pixel values as above described. The outputs of the filtering logic 106 and the MBK1 108 are provided to combine logic 110. Its function is to combine the MBK1 value to the color value of the center 2×4 filter region as above described. The output of combine logic 110 and output of the MBK2 112 are fed to combine logic 114. The function of combine logic 114 is to combine the MBK2 value with the result of the combination of the MBK1 value and the color value of the center 2×4 filter region. The output of combine logic 114, which is the final value for the pixel of interest with Mach band suppression, is provided to the color map 14. The output of the color map 114 drives the DAC 16, as above described.

The construction and operation of FIG. 12 will become apparent from the following description of FIGS. 13–18.

In a preferred implementation of the hardware block diagram of FIG. 12, a plurality of leaf cells, LC, are used to implement the tossing logic 104, the filtering logic 106, MBK1 and MBK2, 108, 112 and the combine logic 110, 114.

Figure 13:
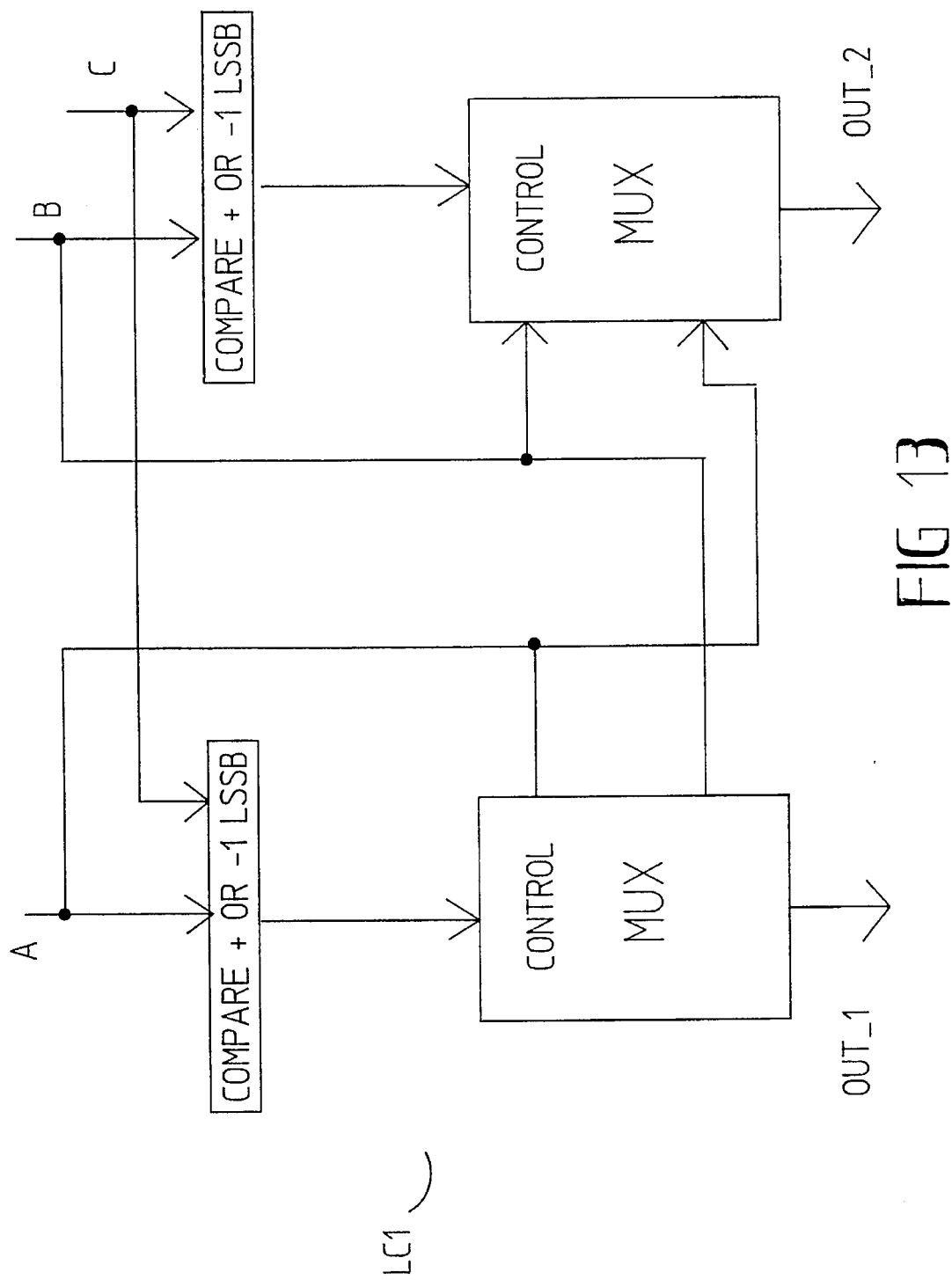
Figure 17:
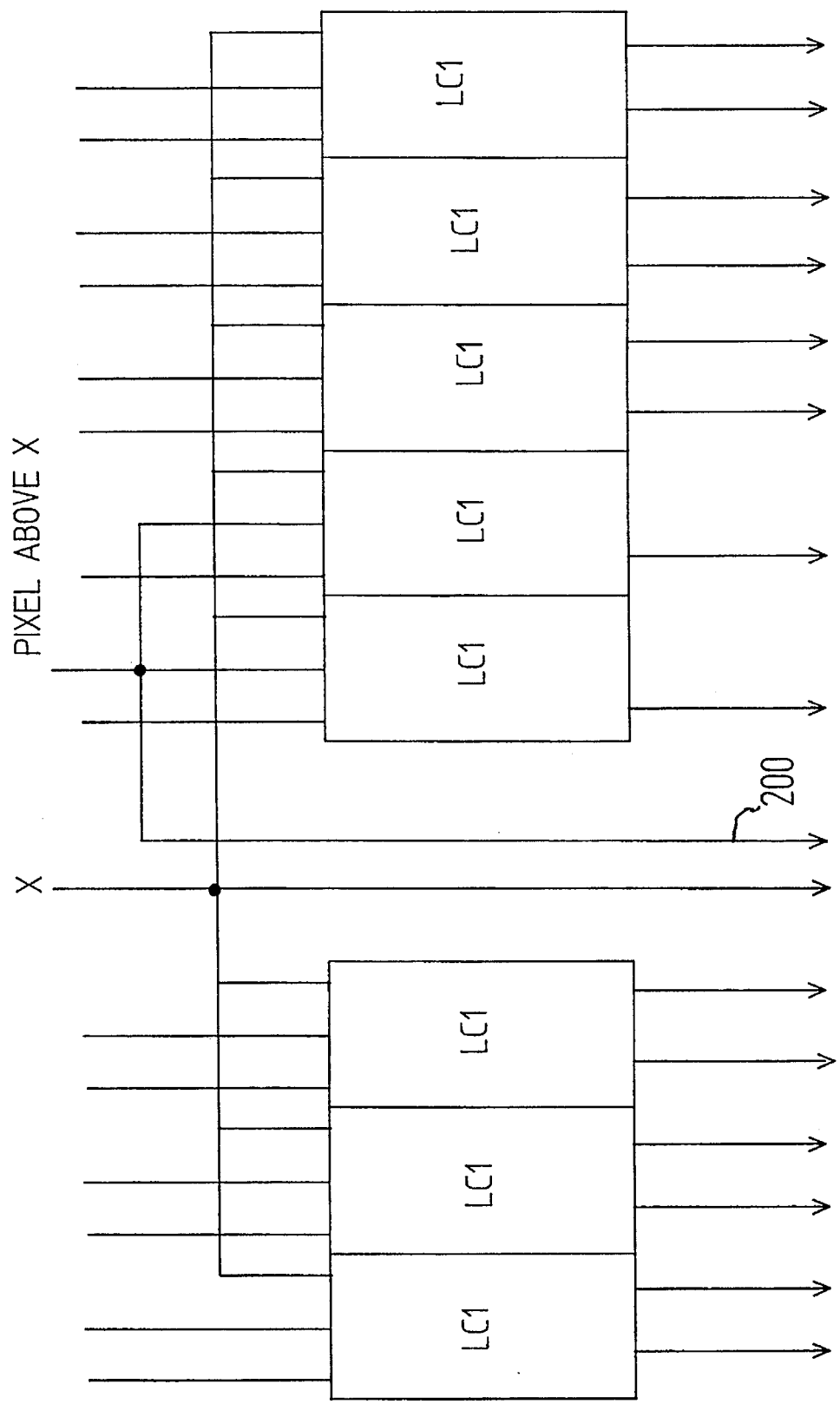

A plurality of leaf cells of the type labelled LC1, illustrated in FIG. 13, are used to implement the tossing logic 104. FIG. 17 shows how a plurality of LC1's are cascaded to construct the tossing logic 104. Referring to FIG. 13, input "C" is always the data taken from the current pixel data register (the one marked with the "X") in portion 102 of FIG. 12. Inputs A and B are the two inputs to be tossed. Out_1 and Out_2 are the outputs. On examination of FIG. 12, it can be seen that the registers 102 holding the center 2×4 filter region are in a somewhat unusual order. The reason for this order is so that the input into each of the leaf cells LC1 is from a different part of the filter region. Also note that the term LSSB is used in FIG. 13. It means Least Significant Significant Bit. For the red and green data channel, the LSSB is the third bit in the data word, while for blue it is the second (3-3-2 format color data). The output of the leaf cell LC1 of FIG. 13 will be (note that input "C" corresponds to the pixel P of interest):

(i) Out_1=A if there is no edge detected between A and the pixel P of interest and Out_2=B if there is no edge detected between B and the pixel P of interest;

(ii) Out_1=B if an edge is detected between A and the pixel P of interest and Out_2=A if an edge is detected between B and the pixel B of interest. For example, if a single edge is detected in the filter region and it passes between A and the pixel P of interest, then Out_1 and Out_2 will equal B. The effect in this case is that the weight of the pixel at B has been doubled while the weight of the pixel at A has been set to 0. Another case that may occur is that two (or more) edges may be detected where at least one edge is between the pixel at A and the pixel P of interest, while another edge passes between the pixel at B and the pixel P of interest. In this case, Out_1 will equal B and Out_2 will equal A. Since both of these pixels should have a weight of 0, another stage of compare logic is required. This is done in the leaf cell logic LC2 described below.

Figure 14:
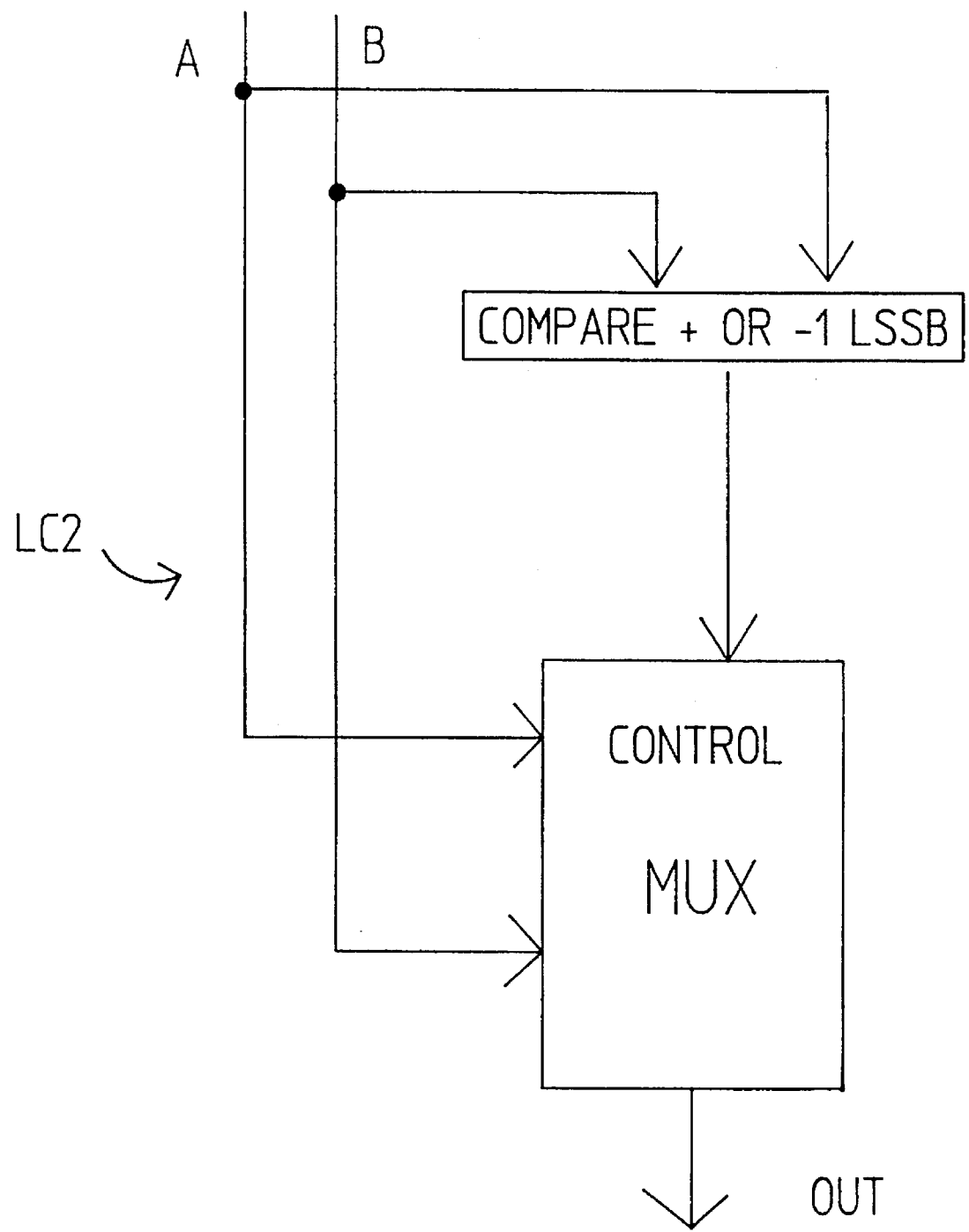
Figure 15:
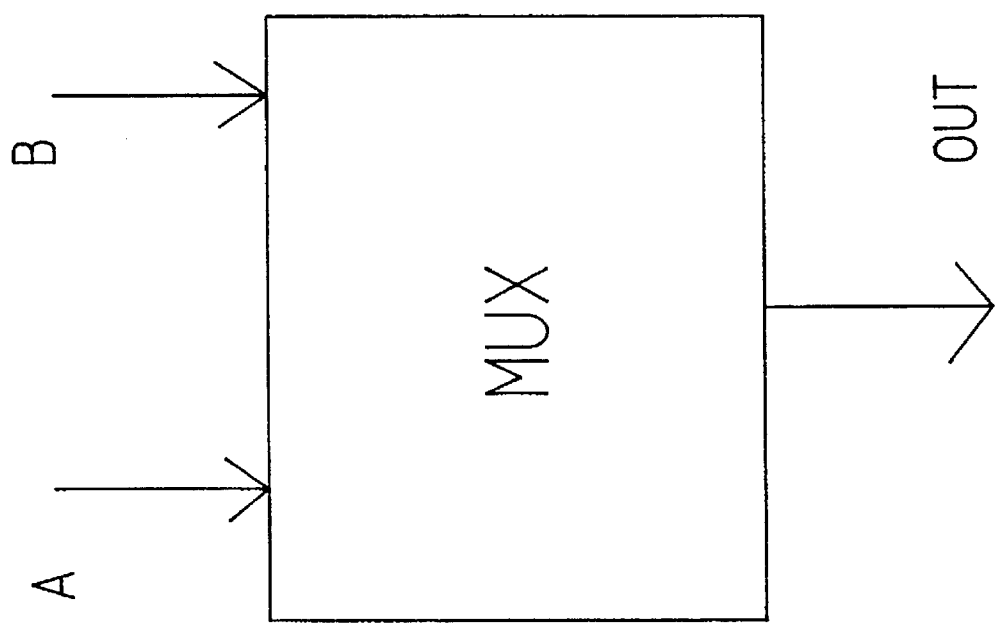

A plurality of leaf cells of the type LC2, as well as a plurality of leaf cells of the type LC3, are used to construct the filtering logic 106. FIG. 14 illustrates an LC2 leaf cell and FIG. 15 illustrates an LC3 leaf cell. (Note that leaf cells LC3 are also used to construct the MBK1 and MBK2.) FIG. 18 shows how a plurality of LC2's and LC3's are cascaded to construct the filtering logic 106.

Each leaf cell LC2 is similar to the leaf cell LC1 of FIG. 13 in that it has compare and MUX logic, but it has only two data inputs, A, B, and one data output, OUT. One of the inputs, B, is always taken from the current pixel data register. The other input, A, is an output from a LC1 leaf cell in the tossing logic 104. The output of a LC2 leaf cell may be either the input from the tossing logic, if no edge is encompassed by the filter, or the current pixel data. The purpose of the LC2 leaf cell is to address the case of when two edges are encompassed by filter, as discussed earlier herein. In this case, the pixel weight accorded to P is as shown in FIG. 9B.

The leaf cell LC3 is merely an adder. Note that the number of bits in the adder will depend upon how far up in the adder tree (FIG. 18) it is. The first stage of adders (A1 in FIG. 18) could receive three bits on each input and produce a four bit answer. The four bit answer will feed another stage of adders (A2 in FIG. 18), and so on, until a six bit answer is received (output of A3 in FIG. 18). The output of A3 is also shown as the output of block 106 in FIG. 12. FIG. 18 corresponds to block 106 of FIG. 12.

Figure 16:
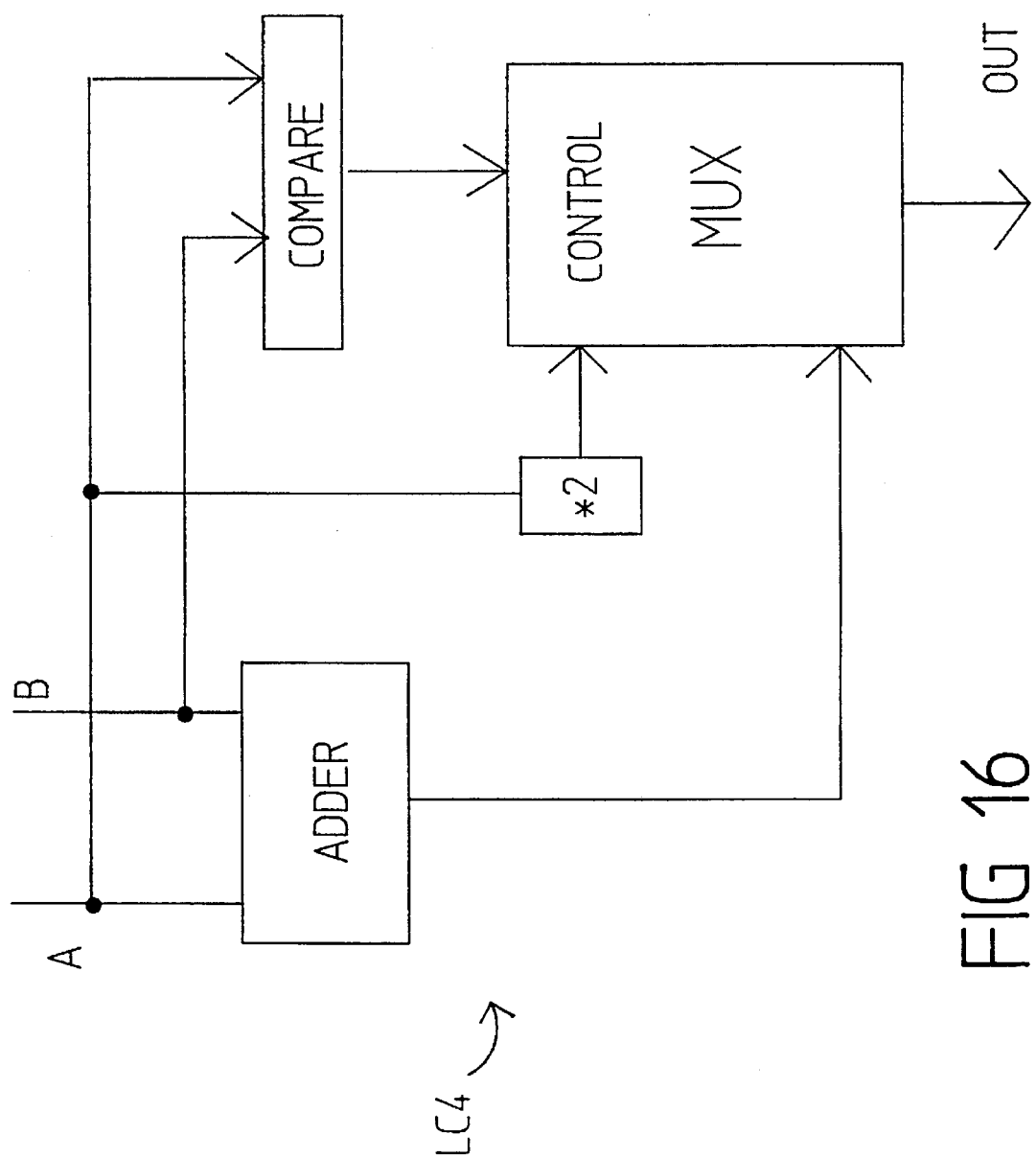

FIG. 16 illustrates another leaf cell LC4 that is used to implement the combine logic 110, 114 of FIG. 12. The function of the combine logic is to determine whether the output of the MBK1 and/or MBK2, 108, 112 should be included in the final color value for the pixel under consideration. The input from the center 2×4 filter region is compared to the Mach band killer 1 output shown in block 110. If the two are within two LSBs of the 8 bit answer, then the two inputs are added. If they are not close enough, then the output is set to the value of the center 2×4 filter region×2. Note that the ×2 multiplication may be performed by shifting wires and realigning the data field. The output from block 110 is then compared to the output of Mach band killer region 2 shown in block 114. If the two are within one LSB of the 8 bit answer, then the two inputs are added. If they are not close enough, then the output is set to the value of the output from block 110 to block 114 times 2.

Using the leaf cells LC1, LC2, LC3, and LC4 of FIGS. 13–16, the tossing logic 104, the filtering logic 106, the Mach band killing logic 108, 112 and the combine logic 110, 114 may be implemented. However, it should be noted that all of the leaf cells LC1–LC4 also need a pipeline register to keep the data in order. The pipeline register (not shown) would be placed on the outputs of each of the leaf cells LC1–LC4.

The inputs and outputs for the tossing logic diagram of FIG. 17 (which corresponds to block 104 of FIG. 12) are as shown in FIG. 12. Note that the data for the current pixel, labeled "X" in FIGS. 12 and 17, is sent to the "C" input of all of the leaf cells LC1. Also note that the data for the current pixel is passed through to the filtering logic 106 as shown by line 200. In addition, the pixel just above the current pixel "X" in the center 2×4 filter may be treated somewhat differently to account for the asymmetry of the filter. The pixel just above the current pixel may be sent to the "Compare" blocks of the LC1 leaf cells for both pixels to the right side of the current pixel. This allows the pixel just above the current pixel to be counted up to three times, to effectively implement the tossing.

In the filtering logic of FIG. 18 (which corresponds to block 106 of FIG. 12), the current pixel data is sent to all of the leaf cells LC2. The output of the leaf cells LC2 is then sent to a tree of adders, previously described, constructed from a plurality of leaf cells LC3, as shown in FIG. 18.

The MBK1 and MBK2 are nothing more than a tree of adders constructed in much the same way as the adder tree of FIG. 18, from leaf cells LC3. MBK1 is comprised of three levels of adders similar to the three layers shown in FIG. 18. MBK2 is comprised of four layers of adders (LC3's).

FIGS. 19a–19e illustrate an important feature of the present invention. That is, how the filter of the present invention operates to remove the visually noticeable periodic noise introduced into the spacial domain (manifested as high frequency components in the frequency domain) by dithering. Note that FIGS. 19a–19e illustrate in two dimensions what is actually happening in three dimensions. FIG. 19a graphically illustrates a uniform color image (i.e., having no edges) before the color data is dithered. Since there are no color edges in the image, it is graphically represented as nothing more than a DC component in the frequency domain. FIG. 19b graphically illustrates the periodic noise, and high frequency components, introduced into such an image by dithering. FIG. 19c, which is the sum of FIGS. 19a and 19b, illustrates the image as stored in the frame buffer 12. Thus, the stored image has a DC component (the flat color field), but high frequency noise, which can be seen by the eye, has been introduced. This is what would be displayed, but for the operation of the present invention. FIG. 19d graphically illustrates an important characteristic of the filter of the present invention, when implemented as above described. In particular, as best seen in the frequency domain graph, the filter has a null at each and every point where one of the high frequency components exists. Thus, as shown in FIG. 19e, application of the filter removes all of the high frequency components introduced by dithering and, hence, cancels the instances of periodic noise introduced by dithering. FIG. 20 compares the performance of the present invention to the other prior art. In particular, FIG. 20 compares interactive speed (x axis) against image quality (y axis). The previously mentioned Edsun CEG method provides relatively high image quality, but lacks high speed interactiveness. Use of traditional 3-3-2 dithered image data allows a high degree of high speed interactiveness, but provides low image quality. Use of the full 24 bits (i.e., the original color information data generated by the computer system before dithering in FIG. 1) allows a high degree of high speed interactiveness and provides very high image quality, but is expensive to implement, since it requires a 24 bit wide frame buffer. The present invention, however, allows a high degree of high speed interactiveness and provides high image quality, but does not require a large frame buffer, and is simple and inexpensive to implement.

Though the filter of the present invention has been described herein as having an effective shape that is identical to the shape of the dither matrix, obvious variations may be employed that are still within the spirit of the invention. For example, consider a 64 entry dither matrix that, in essence, is two 32 entry dither matrices, but in which the lowest order bit is changed between them. The invention would operate with a 32 cell shaped filter in such case. However, since the difference between the two 32 entry dither matrices is only one bit, such a filter is of "effectively" the same shape as the 32 entry dither matrix, and such a variation would be considered within the spirit of the invention. Moreover, the maximum number of recoverable bits would still be $\log_2 32 = 5$. Thus, as used herein, the term "effective shape" encompasses such variations. It should be understood that the term "effective filter shape" is intended herein even where the text recites only the term "filter shape."

In summary, the principal difference between the first and second embodiments is the manner in which the pixel value for the pixel P under consideration is computed.

In the first embodiment (average method), the pixel value for the pixel P is computed:

$$\frac{\sum_{i=0}^{K} (fbd_i)(W_i)}{(count)}$$

where:
 $fbd_i$=frame buffer data; and
 $w_i$=weight of pixel value
 K=number of pixels in the filter
and where:
 if $fbd_1$ passes the edge compare test, then count=count+1 and $W_i$=1, otherwise $W_i$=0.

In the second embodiment (sum method), the pixel value for the pixel P is computed:

$$\sum_{i=0}^{K} (fbd_i)(W_i)$$

where: $fbd_i$ is as above defined; K is the number of pixels in the filter;
 $W_i$ is an integer from 0 to K, and where the sum $$\sum_{i=0}^{K} W_i$$

is an implementation dependent constant.
Note that in FIGS. 9A–9C, the "constant" was always 8 and the constant from FIG. 12 is 32.

Earlier, in connection with step 64 of FIG. 8A, an optional enhanced edge detection method was mentioned. That method will now be described.

It has long been known that luminance enhancement on a per pixel basis can be achieved by subtracting the dither function from the pixel values stored in the frame buffer.

See, for example, "The Effect of Dither on Luminance Quantization of Pictures", B. Lippel and M. Kurland, *IEEE Transactions on Communications Technology*, Vol. COM-19, No. 6, December, 1971, pp. 879–888. See also "Picture Coding Using Pseudo-Random Noise", L. G. Roberts, *IRE Trans. Inform. Theory*, Vol. IT-8, pp. 145–154, February, 1962. For shorthand purposes, this method will be referred to herein as "dither subtraction." However, the 1971 Lippel et al. reference demonstrated that the per pixel enhancements to luminance are not visually important if a correct dithering algorithm is used. Because of this, dither subtraction has fallen out of use.

It has been discovered that dither subtraction may be employed to enhance edge detection, and recover one more LSB for edge detection. However, it is important that in carrying out dither subtraction, the DC component of the image be preserved. Thus, the dither subtraction method of the prior art must be modified somewhat to preserve this DC component. According to the present invention, this is achieved by utilizing a formula of the following form:

$$D^{-1} = 0.5 - \text{Dither}_{xy}$$

where:

$D^{-1}$ is the inverse dither function;

0.5 is an offset to preserve the DC component; and, $\text{Dither}_{xy}$ is the dither function applied to the pixel values (a decimal value between 0 and 1.0).

FIGS. 21A–21F illustrate application of dither subtraction to the present invention. Each Figure is based on the assumption, for purposes of simplicity, that the size of each pixel value stored in the frame buffer is three bits.

Referring to FIG. 21A, assume that the frame buffer stores the value 101 for a particular pixel, as shown by the "x" in FIG. 21A. The question arises, where did this value actually originate from? As shown in FIG. 21B, this pixel value could have originated just above 100 and had a large dither added to it, or, as shown in FIG. 21C, it could have been almost 110 and had a small dither added to it.

Now assume that an edge E is present, as shown in FIG. 21D. Pixels near the left side of the edge E could be saved in the frame buffer as 101, if a large dither is added to them. Pixels near the right side of the edge could be saved as 101 if a small dither is added to them. Note that the chance that the pixels will go to 101 is dependent on the dither value used for that pixel. Also note that a small dither added to the pixels on the left side of the edge E would force 100 to be saved in the frame buffer, and that a large dither added to the pixels on the right side of the edge E would force a 110 to be saved in the frame buffer.

Now assume that two pixels near the right and lefthand sides of the edge E were saved as 101. This would mean that the pixel on the lefthand side had a large dither added and the pixel on the righthand side had a small dither added to it. After subtracting $D_{xy}$, the result would be as shown in FIG. 21E. The 0.5 offset is then added so that the final value given to the two pixels is as shown in FIG. 21F. After completing the dither subtraction process, the compares carried out in the leaf cells LC1 and LC2 (FIGS. 13 and 14) are more precise than 1 LSSB (i.e., ½ LSSB or 1 extra bit is gained). Then the two pixel values indicated by the "x's" in FIG. 21E will be detected as having an edge between them, even though they were both stored as a 101 in the frame buffer. In other words, by using the 3-3-2 data stored in the frame buffer, as well as the dither function used to create the pixel values stored in the frame buffer, 4-4-3 format data of information can be obtained for edge detection. A formal analysis for luminance data can be found in the aforementioned 1962 Roberts reference. However, there are two considerations that must be taken into account. First, since dither subtraction requires knowledge of the actual dither function used to compute each pixel value, an offset must be maintained for each pixel value. Second, as mentioned previously, the DC component of the image must be maintained. This is achieved using the equation described above. By way of example, for the dither function ($\text{Dither}_{xy}$) shown below, application of this equation yields the following:

| $\text{Dither}_{xy}$ | $D^{-1}$ |
|---|---|
| 0.0 | +0.5 |
| 0.25 | +0.25 |
| 0.5 | 0 |
| 0.75 | −0.25 |
| 1.0 | −0.5 |

If the inverse dither $D^{-1}$ is applied to the example of FIG. 21D where pixels on both sides of the edge are stored as 101, then the two pixel values illustrated by the "x" will be assigned values between 110 and 101, and 101 and 100, respectively, as shown in FIG. 21F. This, obviously, will enhance the determination of where the edge E is actually located. Note that the luminance in a flat field is unaffected by this technique.

An optional temporal filtering method was briefly mentioned in connection with step 96 of FIG. 8B. That method will now be described in detail.

The filter region used in connection with one implementation of the invention, as described in connection with FIGS. 10 and 12, is very long in the "X" direction and short in the "Y" direction. A more symmetric filter would produce better results, but would require a larger scan line buffer (e.g., block 30 in FIG. 7 or block 100 in FIG. 12). Obviously, this would require additional expense in implementing the system. The temporal filtering method of the present invention effectively makes the filter more symmetrical without increasing the size of the scan line buffer.

Figure 22A:
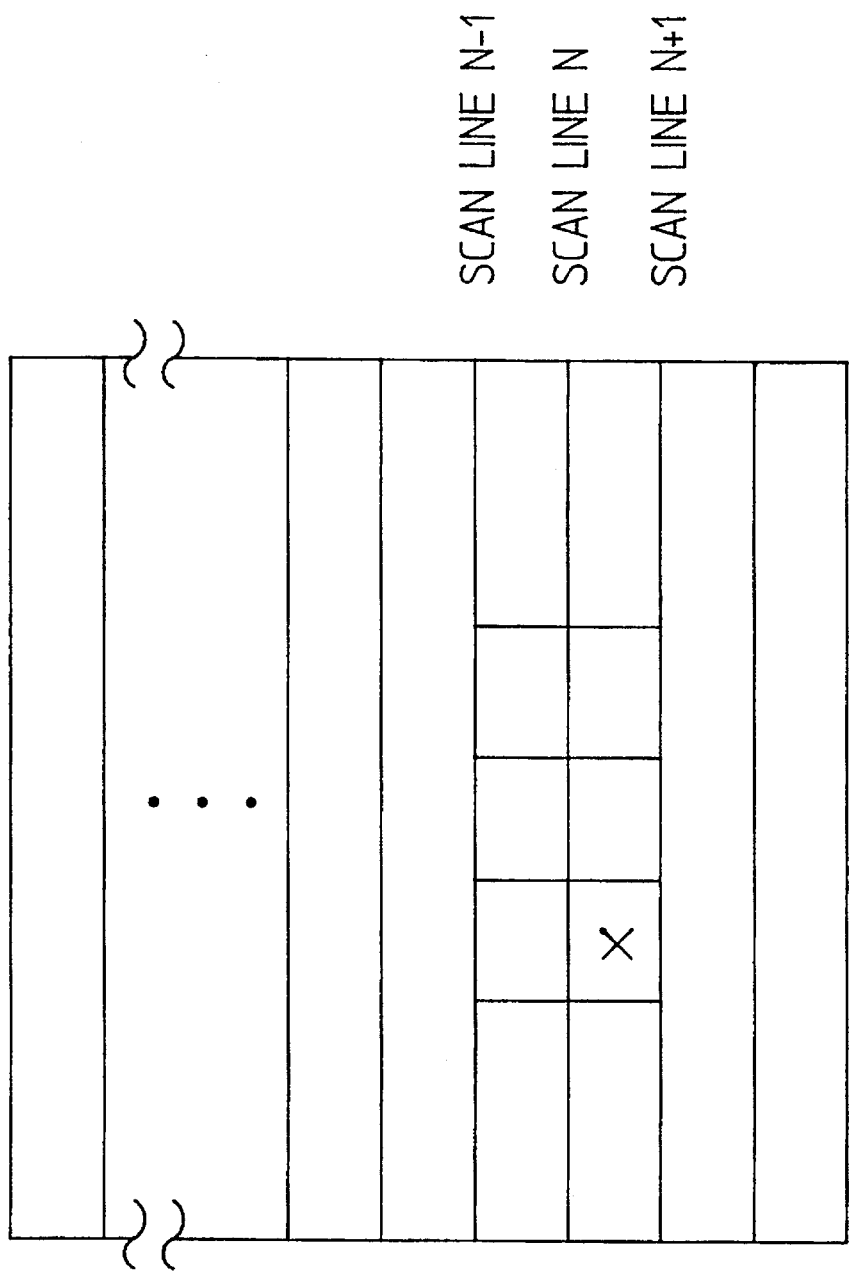
FIGS. 22A and 22B pictorially illustrate the principles of a temporal filter that may be employed in connection with the practice of the present invention.
Figure 22B:
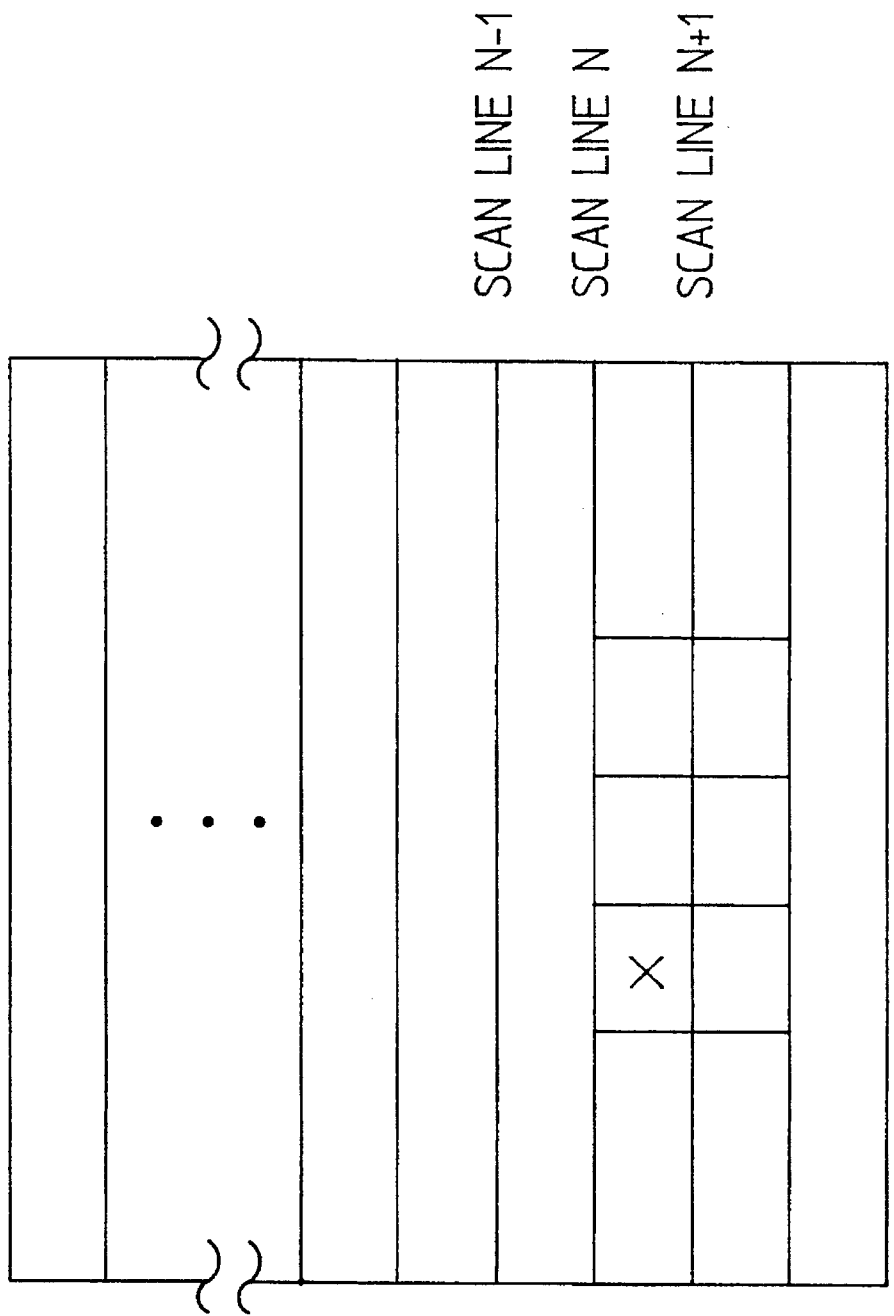

According to the temporal filtering method of the present invention, in a first pass, the filter is applied to the pixel values in the current scan line N and in the previous scan line N−1 (see FIG. 22A) in the manner previously described. However, on a next pass, the filter is applied to pixel values in the current scan line, N and in a subsequent scan line N+1, as shown in FIG. 22B. In FIGS. 22A and 22B, the "x" indicates the pixel P of interest. In particular, for even numbered frames, the filter is applied over the current scan line and the previous scan line, whereas for odd numbered frames, the filter is applied over the current scan line and a subsequent scan line. Of course, the invention is not limited to using the previous scan line for even numbered frames and the subsequent scan line for odd numbered frames, but rather the two may be reversed. Additionally, the invention is not limited to using data from a single scan line buffer for this purpose. The effect of employing this method is the same as if a larger filter region were employed.

Figure 23:
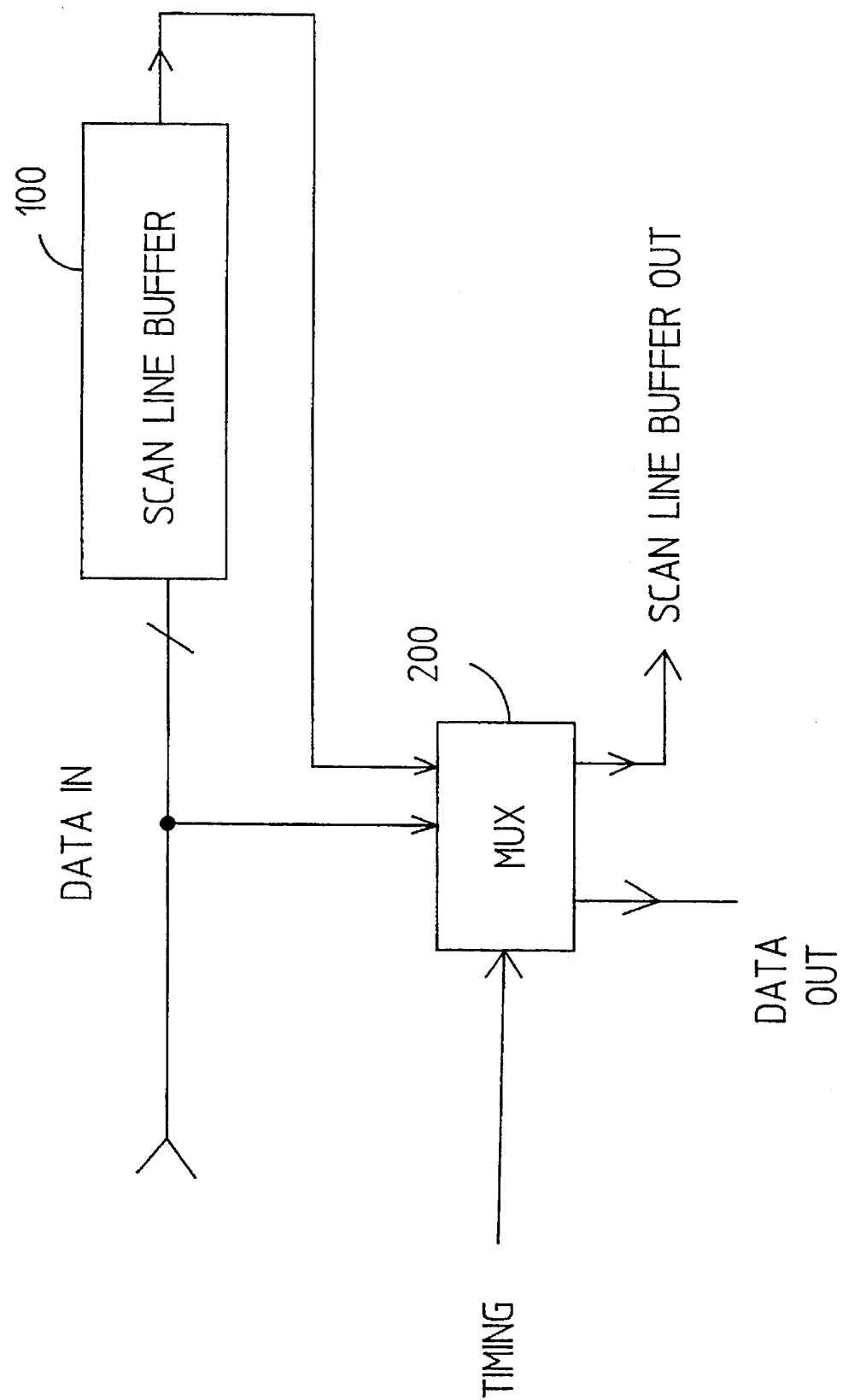
FIG. 23 illustrates a modification to the block diagram of FIG. 12 to implement a temporal filter feature according to the present invention.

A hardware implementation of the temporal filtering feature of the invention is illustrated in FIG. 23. FIG. 23 represents a modification to the block diagram of FIG. 12. As shown, a MUX 200 is interposed between the data-in line and the scan line buffer 100, on the one hand, and the remainder of the logic of FIG. 12, on the other hand. The MUX 200 operates under control of video timing to simply toggle the ordering of the scan lines available for processing by the filter. Thus, when toggled in a first state, the current and previous scan lines are available in the scan line buffer 100 and registers 102, respectively, and when toggled in a second state, the current scan line and subsequent scan line are stored in the registers 102 and scan line buffer 100 respectively. It will be appreciated, this is achieved by changing the timing for loading the scan line buffer to start one scan line before an active frame starts. Loading of the scan line of interest into the scan line buffer is preferably performed during a blanking interval.

The present invention may be embodied in other specific forms without departing from the spirit or essential attributes thereof and, accordingly, reference should be made to the appended claims, rather than to the foregoing specification, as indicating the scope of the invention.

I claim:

1. In an interactive computer graphics system of the type that generates color information data for pixels of a display, and wherein pixel values corresponding to color information for each pixel are stored in a frame buffer, and further wherein the pixel values are obtained by dithering components of the color information data using a dither matrix, whereby color information data is lost as a result of said dithering, a method for recovering at least a portion of said lost data comprising the steps of:

a) defining a filter having an effective shape S;

b) reading ones of the pixel values from the frame buffer;

c) filtering components of the read pixel values with the filter while dynamically altering the effective shape of the filter in response to changes in magnitudes of the components of the read pixels values that indicate an edge in an image to be displayed to recover at least a portion of the lost data;

d) employing the filtered components to illuminate the pixels.

2. Method according to claim 1 wherein the effective shape S of the filter defined in step (a) is the same as an effective shape S of the dither matrix.

3. Method according to claim 2 wherein the dither matrix comprises K dither cells and step (c) comprises passing K pixel values from a region of shape S of the read ones of the pixel values through the filter and weighting, in the filter, the K ones of the pixel values according to whether any edges are encompassed in the region S, and obtaining a sum thereof in accordance with the weighting, the sum being employed to obtain one of said filtered components and embodying said recovered data, the recovered data being a number of bits, the value of K being at least $2^N$, where N represents a maximum number of recoverable bits.

4. Method according to claim 3 wherein step (c) further comprises obtaining an average value of the summed pixel values, the average value being the said one of the filtered components.

5. Method according to claim 4 wherein, when an edge is encompassed in the region S, ones of the K pixel values falling on a first side of the edge are accorded substantially zero weight, and the sum and average are obtained employing only the K ones of the pixel values falling on a second side of the edge.

6. Method according to claim 3 wherein each of the K ones of the pixel values is initially accorded an uniform weight, and wherein, when an edge is encompassed in the region S, the weights of the pixel values corresponding to pixels on substantially one side of the edge are uniformly redistributed to all pixel values corresponding to pixels on the other side of the edge, the weights of the pixel values corresponding to the pixels on said one side of the edge being substantially zero after said redistribution.

7. Method according to claim 3 wherein each of the K ones of the pixel values is initially accorded a uniform discrete unit of weight, and wherein, when an edge is encompassed in the region S, the discrete units of weight of the pixel values corresponding to pixels on substantially one side of the edge are redistributed, in discrete units, to at least some of the pixel values corresponding to pixels on the other side of the edge, the weights of the pixel values corresponding to the pixels on said one side of the edge being substantially zero after said redistribution.

8. Method according to claim 1 wherein there are three components of the color information data and each component represents a specific color characteristic of a corresponding pixel.

9. Method according to claim 3 wherein there is a separate dither matrix for each component, and N represents a maximum number of recoverable bits per component.

10. Method according to claim 1 wherein the dither matrix comprises K dither cells, and wherein groups of the stored pixel values correspond to lines of pixels of the display, each defining a scan line, and wherein step (b) comprises reading one scan line of stored pixel values from the frame buffer, defining a current scan line, there being a previous scan line available for processing, there being a region of shape S encompassing a portion of, and the K ones of the pixel values being from, both the current and previous scan lines, and wherein step (c) comprises sequentially indexing across sequential regions of shape S of the current and previous scan lines, and upon each indexing, passing K ones of the pixels from regions of shape S through the filter.

11. Method according to claim 1 further comprising the step of subtracting a representation of the dither matrix having a substantial DC component of the color information data therein from the read ones of the stored pixel values prior to performing step (c).

12. Method according to claim 1 wherein the dither matrix comprises K dither cells and step (c) comprises filtering K pixel values from a region of shape S of the read ones of the pixel values, and groups of the stored pixel values correspond to lines of pixels of the display, each defining a scan line, the frame buffer storing a frame of scan lines to be displayed, the frame buffer being refreshed with even and odd numbered frames, there being previous, current and subsequent scan lines available for processing, and further wherein, for processing the current scan line in even numbered frames, the region of shape S encompasses a portion of, and K ones of the pixel values are from, both the current and previous scan lines, and for processing the current scan line in odd numbered frames, the region of shape S encompasses a portion of, and the K ones of the pixel values are from, both the current and subsequent scan lines.

13. In an interactive computer color graphics system of the type that generates three color components for each pixel of a display, each color component having a bit length, a method comprising the steps of:

a) dithering each color component using a dither matrix of shape S having K dither cells, to obtain, for each corresponding pixel, a pixel value of shorter bit length and having reduced color information than the corresponding color component;

b) storing the pixel values for a particular frame to be displayed frame in a frame buffer;

c) reading ones of the stored pixel values from the frame buffer;

d) selecting a pixel P corresponding to one of the pixels read from the frame buffer;

e) weighting K ones of the pixel values read from the frame buffer in a region of effective shape S thereof, including the pixel value corresponding to the selected pixel P, to obtain a sum of the K pixel values based upon whether magnitudes of the K ones of the pixel values indicate that an edge in an image to be displayed is encompassed in the region of shape S, each of the K ones of the pixel values initially being accorded an uniform weight, and wherein, when an edge is encompassed, the weights of the pixel values corresponding to pixels on one side of the edge are redistributed to pixel values corresponding to pixels on the other side of the edge, the weights of the pixel values corresponding to the pixels on said one side of the edge being substantially zero after said redistribution;

f) employing the sum to illuminate the selected pixel P; and g) repeating at least steps (d) through (f) for all pixels in the display;

the sums employed to illuminate the pixels containing additional color information bits than corresponding pixel values stored in the frame buffer, the value of K being at least $2^N$, where N represents a maximum number of additional color information bits that can be contained in the sums.

14. Method according to claim 13 wherein, when an edge is encompassed, the weights of the pixel values corresponding to pixels on substantially one side of the edge are uniformly redistributed to all pixel values corresponding to pixels on the other side of the edge.

15. Method according to claim 13 wherein, when an edge is encompassed, discrete units of weight of the pixel values corresponding to pixels on substantially one side of the edge are redistributed, in discrete units, to at least some of the pixel values corresponding to pixels on the other side of the edge.

16. Method according to claim 13 wherein the three color components are one of (i) intensities of red, green and blue; or (ii) luminance, a difference between intensities of blue and yellow and a difference between intensities of red and yellow.

17. Method according to claim 13 further comprising the step of subtracting a representation of the dither matrix from the read ones of the stored pixel values prior to performing step (e).

18. Method according to claim 13 wherein groups of the stored pixel values correspond to lines of pixels of the display, each defining a scan line, the frame buffer being refreshed with even and odd numbered frames, there being previous, current and subsequent scan lines available for processing, and further wherein, for processing the current scan line in even numbered frames, the region of shape S encompasses a portion of, and the K ones of the pixel values are from, both the current and previous scan lines, and for processing the current scan line in odd numbered frames, the region of shape S encompasses a portion of, and the K ones of the pixel values are from, both the current and subsequent scan lines.

* * * * *